United States Patent
Fujii

(10) Patent No.: US 11,302,188 B2
(45) Date of Patent: Apr. 12, 2022

(54) COMMUNICATION APPARATUS AND COMPUTER READABLE MEDIUM

(71) Applicant: MITSUBISHI ELECTRIC CORPORATION, Tokyo (JP)

(72) Inventor: Teruko Fujii, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 133 days.

(21) Appl. No.: 16/961,437

(22) PCT Filed: Feb. 9, 2018

(86) PCT No.: PCT/JP2018/004571
§ 371 (c)(1),
(2) Date: Jul. 10, 2020

(87) PCT Pub. No.: WO2019/155599
PCT Pub. Date: Aug. 15, 2019

(65) Prior Publication Data
US 2020/0357278 A1    Nov. 12, 2020

(51) Int. Cl.
*G08G 1/09* (2006.01)
*H04W 4/44* (2018.01)
*H04W 28/14* (2009.01)

(52) U.S. Cl.
CPC .............. *G08G 1/093* (2013.01); *H04W 4/44* (2018.02); *H04W 28/14* (2013.01)

(58) Field of Classification Search
CPC ......... G08G 1/093; G08G 1/094; H04W 4/44; H04W 28/14; H04W 4/02; H04W 4/027; H04W 4/024; H04W 4/40
See application file for complete search history.

(56) References Cited

U.S. PATENT DOCUMENTS

2007/0129082 A1* 6/2007 Thacher ................. G01C 21/30
                                                      455/456.1
2013/0325284 A1* 12/2013 Sato ..................... G08G 1/0104
                                                         701/96

(Continued)

FOREIGN PATENT DOCUMENTS

JP      2004-287724 A    10/2004
JP      2005-435 A        1/2005

(Continued)

OTHER PUBLICATIONS

International Search Report, issued in PCT/JP2018/004571, dated May 15, 2018.

(Continued)

*Primary Examiner* — Rebecca E Song
(74) *Attorney, Agent, or Firm* — Birch, Stewart, Kolasch & Birch, LLP

(57) ABSTRACT

A communication apparatus determines a transmission mode to specify a priority order of a plurality of types of vehicle information for each traveling section, based on each transmission speed in one or more traveling sections. The communication apparatus selects a transmission mode at a position where a vehicle is traveling, from among transmission modes in each traveling section. The communication apparatus transmits the plurality of types of vehicle information in accordance with the priority order specified in the selected transmission mode.

16 Claims, 21 Drawing Sheets

(56) References Cited

U.S. PATENT DOCUMENTS

2014/0207357 A1* 7/2014 Shimotani .............. B60K 31/00
  701/93
2015/0326283 A1   11/2015 Nagata et al.

FOREIGN PATENT DOCUMENTS

| JP | 2006-146645 A | 6/2006 |
| JP | 2008-77143 A | 4/2008 |
| JP | 2008-199381 A | 8/2008 |
| JP | 2009-267963 A | 11/2009 |
| JP | 2012-205116 A | 10/2012 |
| JP | 2012-248107 A | 12/2012 |
| JP | 2014-121027 A | 6/2014 |
| JP | 2014-191801 A | 10/2014 |

OTHER PUBLICATIONS

Japanese Office Action for the corresponding Application No. 2018-537893, dated Nov. 6, 2018 with machine translation.

* cited by examiner

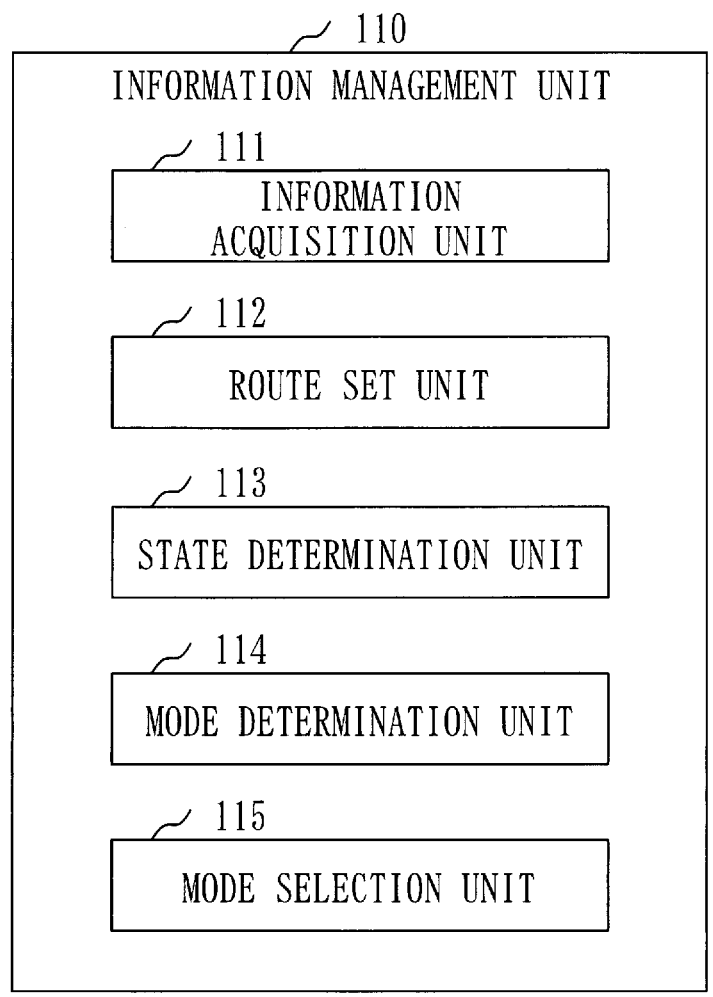

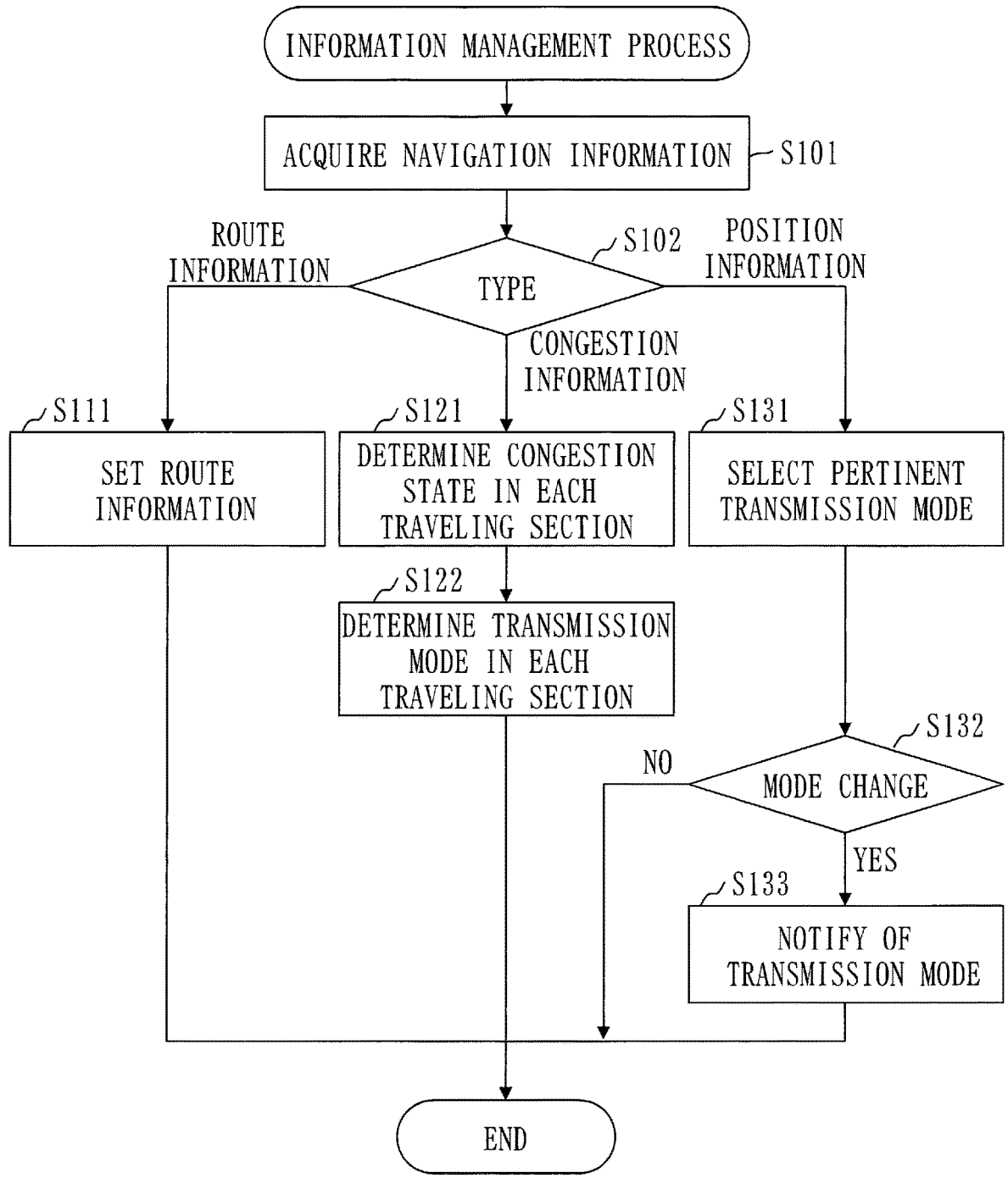

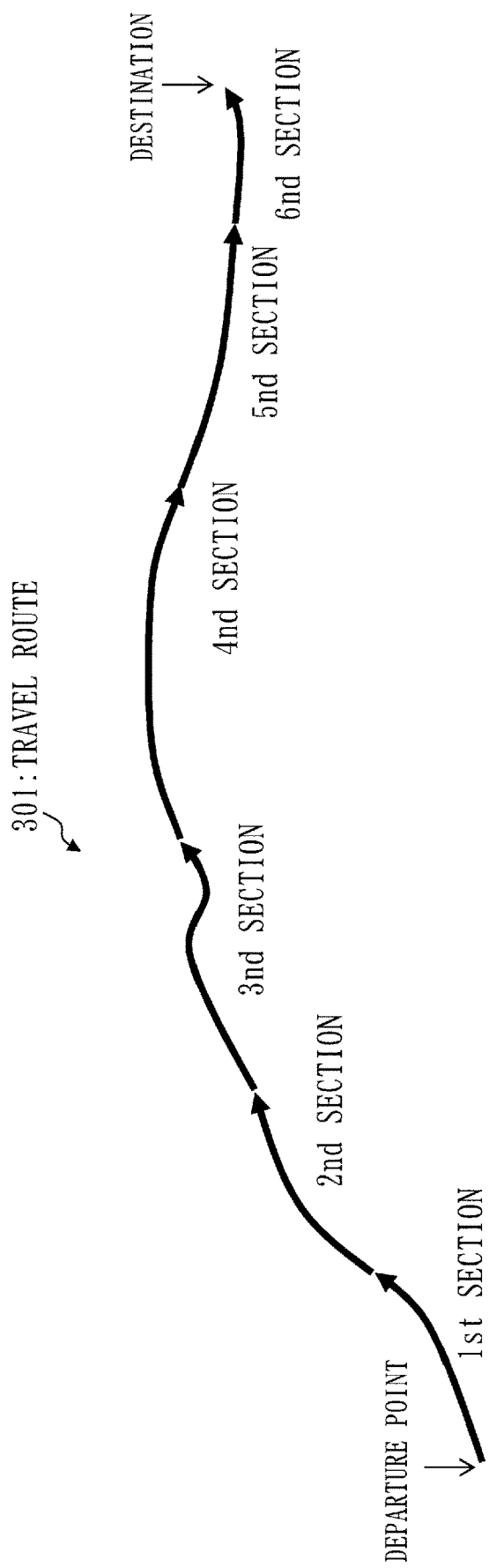

Fig. 6

310:CONTROL TABLE

| No. | ROUTE INFORMATION | | | | CONGESTION STATE | TRANSMISSION MODE |
|---|---|---|---|---|---|---|
| | STARTING POSITION | END POSITION | DISTANCE | TRANSMISSION SPEED | | |
| 1 | (x1, y1) | (x2, y2) | 220m | 19Mbps | ABSENT | NORMAL |
| 2 | (x2, y2) | (x3, y3) | 162m | 20Mbps | ABSENT | NORMAL |
| 3 | (x3, y3) | (x4, y4) | 379m | 19Mbps | ABSENT | ACCELERATION |
| 4 | (x4, y4) | (x5, y5) | 412m | 2Mbps | ABSENT | LOW-RATE |
| 5 | (x5, y5) | (x6, y6) | 241m | 18Mbps | ABSENT | ACCELERATION |
| 6 | (x6, y6) | (x7, y7) | 278m | 19Mbps | ABSENT | NORMAL |
| 7 | (x7, y7) | (x8, y8) | 412m | 20Mbps | ABSENT | NORMAL |
| 8 | (x8, y8) | (x9, y9) | 235m | 19Mbps | ABSENT | NORMAL |
| 9 | (x9, y9) | (x10, y10) | 132m | 18Mbps | ABSENT | ACCELERATION |
| 10 | (x10, y10) | (x11, y11) | 228m | 16Mbps | PRESENT | LOW-RATE |
| 11 | (x11, y11) | (x12, y12) | 135m | 15Mbps | PRESENT | LOW-RATE |
| 12 | (x12, y12) | (x13, y13) | 175m | 16Mbps | PRESENT | LOW-RATE |
| 13 | (x13, y13) | (x14, y14) | 80m | 18Mbps | ABSENT | ACCELERATION |
| 14 | (x14, y14) | (x15, y15) | 129m | 20Mbps | ABSENT | ACCELERATION |
| 15 | (x15, y15) | (x16, y16) | 282m | 19Mbps | ABSENT | NORMAL |
| ... | ... | ... | ... | ... | ... | ... |

Fig. 7

320: MODE DETERMINATION CONDITION

| CONGESTION STATE / TRANSMISSION SPEED | PRESENT | ABSENT |
|---|---|---|
| SMALLER THAN REFERENCE SPEED | "LOW-RATE" | "LOW-RATE" |
| EQUAL TO OR MORE THAN REFERENCE SPEED | "NORMAL" | (1) IF AT LEAST A PART OF TRAVELING SECTION IS INCLUDED IN ADJUSTMENT SECTION: "ACCELERATION"<br>(2) IF EVEN AT LEAST A PART OF TRAVELLING SECTION IS NOT INCLUDED IN ADJUSTMENT SECTION: "NORMAL" |

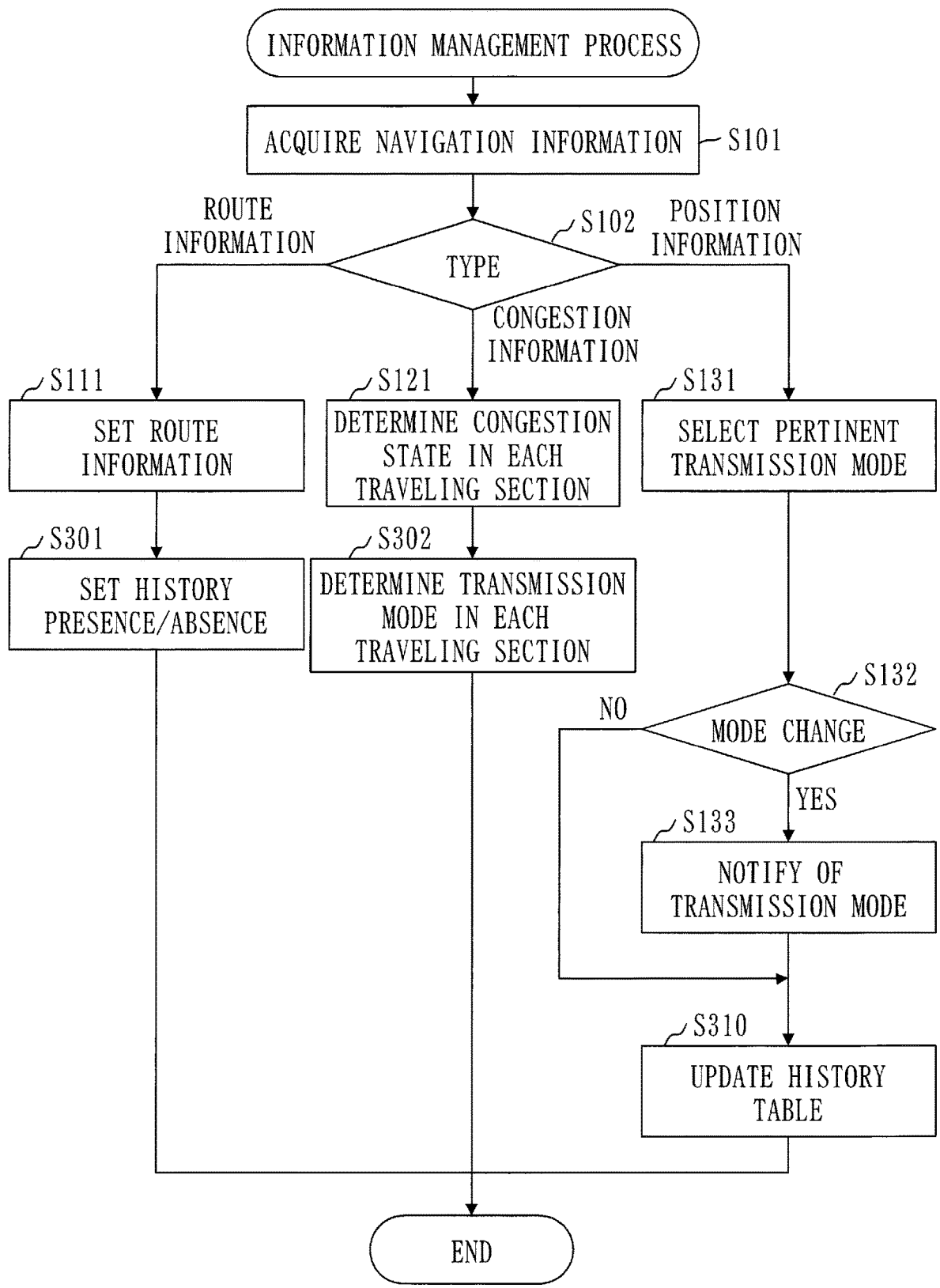

Fig.18

310:CONTROL TABLE

| No. | ROUTE INFORMATION | | | | HISTORY PRESENCE/ ABSENCE | CONGESTION STATE | TRANSMISSION MODE |
|---|---|---|---|---|---|---|---|
| | STARTING POSITION | END POSITION | DISTANCE | TRANSMISSION SPEED | | | |
| 1 | (x1, y1) | (x2, y2) | 220m | 19Mbps | ABSENT | ABSENT | NORMAL |
| 2 | (x2, y2) | (x3, y3) | 162m | 20Mbps | ABSENT | ABSENT | NORMAL |
| 3 | (x3, y3) | (x4, y4) | 379m | 19Mbps | ABSENT | ABSENT | ACCELERATION |
| 4 | (x4, y4) | (x5, y5) | 412m | 2Mbps | PRESENT | ABSENT | LOW-RATE |
| 5 | (x5, y5) | (x6, y6) | 241m | 18Mbps | ABSENT | ABSENT | ACCELERATION |
| 6 | (x6, y6) | (x7, y7) | 278m | 19Mbps | ABSENT | ABSENT | NORMAL |
| 7 | (x7, y7) | (x8, y8) | 412m | 20Mbps | ABSENT | ABSENT | NORMAL |
| 8 | (x8, y8) | (x9, y9) | 235m | 19Mbps | ABSENT | ABSENT | NORMAL |
| 9 | (x9, y9) | (x10, y10) | 132m | 18Mbps | ABSENT | ABSENT | ACCELERATION |
| 10 | (x10, y10) | (x11, y11) | 228m | 16Mbps | ABSENT | PRESENT | LOW-RATE |
| 11 | (x11, y11) | (x12, y12) | 135m | 15Mbps | ABSENT | PRESENT | LOW-RATE |
| 12 | (x12, y12) | (x13, y13) | 175m | 16Mbps | ABSENT | PRESENT | LOW-RATE |
| 13 | (x13, y13) | (x14, y14) | 80m | 18Mbps | ABSENT | ABSENT | ACCELERATION |
| 14 | (x14, y14) | (x15, y15) | 129m | 20Mbps | ABSENT | ABSENT | ACCELERATION |
| 15 | (x15, y15) | (x16, y16) | 282m | 19Mbps | ABSENT | ABSENT | NORMAL |
| ... | ... | ... | ... | ... | ... | ... | ... |

Fig.19

330:HISTORY TABLE

| STARTING POSITION | END POSITION | DETECTION TIME | COMMUNICATION STATE |
|---|---|---|---|
| (x1, y1) | (x2, y2) | Year1/month1/day1 h1:m1 | ERROR |
| (x6, y6) | (x7, y7) | Year2/month2/day2 h2:m2 | ERROR |
| (x13, y13) | (x14, y14) | Year3/month3/day3 h3:m3 | ERROR |

COMMUNICATION APPARATUS AND COMPUTER READABLE MEDIUM

TECHNICAL FIELD

The present invention relates to a technique to transmit vehicle information.

BACKGROUND ART

Patent Literature 1 discloses a communication apparatus for uploading vehicle information.

The communication apparatus acquires beforehand a travel route of a vehicle and data of communication quality of an area in which the travel route is included. Then, the communication apparatus divides the vehicle information into a plurality of packets and transmits the plurality of packets. At this time, the communication apparatus divides the vehicle information in accordance with the worst communication quality of the communication quality of each area where the vehicle travels until transmission of overall vehicle information is completed. This makes it possible to prevent failure in packet transmission while traveling through an area where communication quality is low.

Patent Literature 2 discloses a communication method as follows.

In an area where the communication quality is low, a cloud server selects a vehicle to transmit vehicle information from the area. This makes it possible to reduce communication traffic volume in the area. As a result, it is possible to prevent failure in transmission in an area where the communication quality is low.

CITATION LIST

Patent Literature

Patent Literature 1: JP2008-199381 A
Patent Literature 2: JP2006-146645 A

SUMMARY OF INVENTION

Technical Problem

The communication apparatus disclosed in Patent Literature 1 transmits packets in accordance with the communication quality in an area where communication quality is low even while traveling through an area where communication quality is high. Therefore, the throughput is degraded, and it takes long time until transmission of overall vehicle information is completed.

The communication method disclosed in Patent Literature 2, it is necessary for the cloud server to acknowledge the latest communication quality in all areas, and to designate whether transmission of vehicle information is necessary to all vehicles. Therefore, a load on the cloud server is increased.

The present invention is aimed at making it possible for a communication apparatus to transmit vehicle information efficiently.

Solution to Problem

There is provided according to the present invention, a communication apparatus includes:
a mode determination unit to determine, based on each transmission speed in one or more traveling sections, a transmission mode to specify a priority order of a plurality of types of vehicle information, for each of the one or more traveling sections;
a mode selection unit to select a transmission mode at a position where a vehicle is traveling, from the transmission mode in each of the one or more traveling sections, and
a transmission unit to transmit the plurality of types of vehicle information in accordance with the priority order specified in the selected transmission mode.

Advantageous Effects of Invention

According to the present invention, it is possible for a communication apparatus to transmit vehicle information efficiently.

BRIEF DESCRIPTION OF DRAWINGS

FIG. 3 is a configuration diagram of an information management unit 110 according to the first embodiment;
FIG. 4 is a flowchart of an information management process according to the first embodiment;
FIG. 5 is a diagram illustrating a travel route 301 according to the first embodiment;
FIG. 6 is a diagram illustrating a control table 310 according to the first embodiment;
FIG. 7 is a diagram illustrating a mode determination condition 320 according to the first embodiment;
FIG. 17 is a flowchart of an information management process according to the third embodiment;
FIG. 18 is a diagram illustrating a control table 310 according to the third embodiment;
FIG. 19 is a diagram illustrating a history table 330 according to the third embodiment.

DESCRIPTION OF EMBODIMENTS

Figure 1:
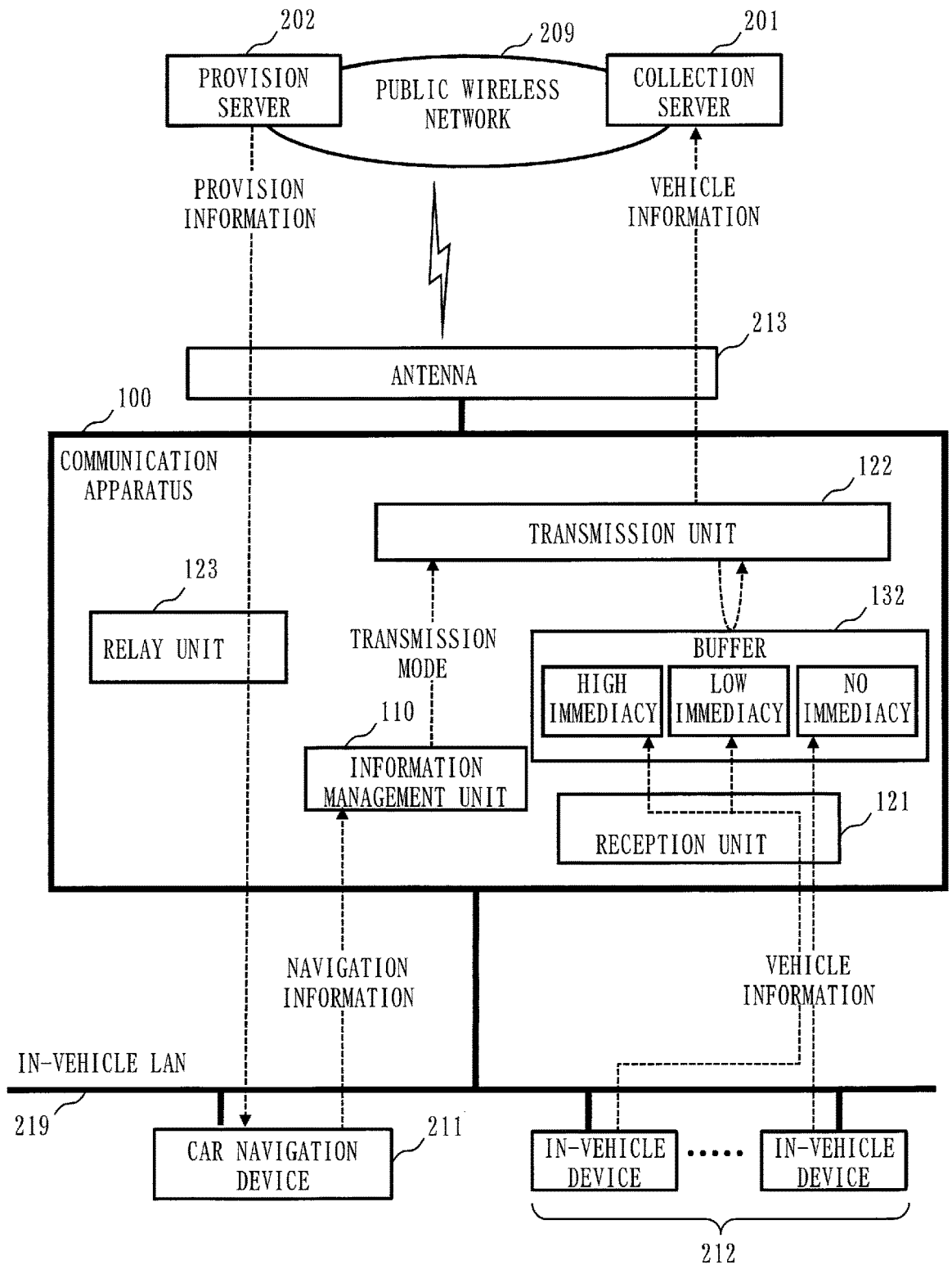
FIG. 1 is a configuration diagram of a communication system 200 according to a first embodiment.

In embodiments and diagrams, same elements and corresponding elements are denoted by the same reference numerals. Explanation for the elements with the same reference numerals will be omitted or simplified appropriately. Arrows in the diagrams mainly illustrate flows of data or flows of processing.

First Embodiment

Explanation will be provided of a mode wherein vehicle information is transmitted efficiently based on FIG. 1 through FIG. 10.

*Explanation of Configuration*

Based on FIG. 1, the configuration of the communication system 200 will be described.

The communication system 200 includes a communication apparatus 100, a car navigation device 211, in-vehicle devices 212, an antenna 213 and an in-vehicle LAN 219. These are mounted on a vehicle.

The communication system further includes a collection server 201, a provision server 202 and a public wireless network 209. These are provided outside of a vehicle.

The collection server 201 and the provision server 202 are connected to the public wireless network 209.

The communication apparatus 100 communicates with the collection server 201 and the provision server 202 via the public wireless network 209.

The public wireless network 209 is a network for wireless communication.

The antenna 213 is an antenna for wireless communication.

The collection server 201 is a server to collect vehicle information from the communication apparatus 100.

The vehicle information is information transmitted from the communication apparatus 100, that is, information transmitted from a vehicle whereon the communication apparatus 100 is mounted. The vehicle information is obtained by the in-vehicle devices 212.

Specific vehicle information is traveling information of a vehicle or snap shot images around a vehicle, etc. The traveling information indicates speed of a vehicle and an acceleration rate of the vehicle. In the snap shot images, the periphery of the vehicle appears.

In the present embodiment, information corresponds to data. That is, the information can be read as data.

The provision server 202 is a server to provide provision information.

The communication apparatus 100 relays the provision information from the provision server 202 to the car navigation device 211.

The provision information is information provided from the provision server 202 to the car navigation device 211. The provision information will be described below in detail.

The car navigation device 211 and the in-vehicle devices 212 are connected to the in-car LAN 219.

The communication apparatus 100 communicates with the car navigation device 211 and the in-vehicle devices 212 via the in-car LAN 219.

The in-vehicle LAN 219 is a communication network inside a vehicle.

The car navigation device 211 receives the provision information from the provision server 202, generates navigation information based on the provision information, and transmits the navigation information to the communication apparatus 100.

The navigation information is information for car navigation. The navigation information will be described below in detail.

The in-vehicle devices 212 are devices mounted on a vehicle. However, the communication apparatus 100 and the car navigation device 211 are omitted.

Specific in-vehicle devices 212 are a speed sensor, an acceleration rate sensor or a camera, etc.

The speed sensor measures speed of a vehicle.

The acceleration rate sensor measures an acceleration rate of a vehicle.

The camera obtains a snap shot image where the periphery of a vehicle appears by taking a picture of the periphery of the vehicle.

The communication apparatus 100 includes an information management unit 110, a reception unit 121, a transmission unit 122, a relay unit 123 and a buffer 132.

The information management unit 110 determines a transmission mode based on navigation information.

The transmission mode specifies a priority order on vehicle information of a plurality of types of vehicle information.

The plurality of types of vehicle information is vehicle information of a first type, vehicle information of a second type, and vehicle information of a third type.

The vehicle information of the first type is vehicle information high in immediacy. The vehicle information high in immediacy is called vehicle information with high immediacy. The vehicle information with high immediacy has a short period of validity. For example, the term of validity is about a few seconds.

The vehicle information of the second type is vehicle information low in immediacy. The vehicle information low in immediacy is called vehicle information with low immediacy. The vehicle information with low immediacy has a relatively long period of validity. For example, the term of validity is about a few minutes.

The vehicle information of the third type is vehicle information that has no immediacy. The vehicle information that has no immediacy is called vehicle information lacking immediacy. The vehicle information lacking immediacy has a long period of validity. For example, the term of validity is equal to or longer than 10 minutes.

The reception unit 121 receives vehicle information from the in-vehicle device 212, and stores the vehicle information by type in the buffer 132.

The transmission unit 122 acquires each type of vehicle information from the buffer 132 in accordance with the priority order specified in the transmission mode, and transmits each type of vehicle information to the collection server 201 in the acquisition order.

That is, the transmission unit 122 transmits a plurality of types of vehicle information in accordance with the priority order specified in the transmission mode.

The relay unit 123 relays provision information from the provision server 202 to the car navigation device 211.

The configuration of the communication apparatus 100 will be described based on FIG. 2.

The communication apparatus 100 is a computer equipped with hardware components such as a processor 101, a memory 102, an auxiliary storage device 103, a wireless communication module 104, a network interface 105 and a timer 106. These hardware components are connected to one another via signal lines.

The processor 101 is an IC (Integrated Circuit) that performs arithmetic processing, and controls other hardware components. For example, the processor 101 is a CPU (Central Processing Unit), a DSP (Digital Signal Processor) or a GPU (Graphics Processing Unit).

The memory 102 is a volatile storage device. The memory 102 is also called a main storage device or a main memory. For example, the memory 102 is a RAM (Random Access Memory). The data stored in the memory 102 is stored in the auxiliary storage device 103 as needed.

The auxiliary storage device 103 is a non-volatile storage device. For example, the auxiliary storage device 103 is a ROM (Read Only Memory), an HDD (Hard Disk Drive) or a flash memory. The data stored in the auxiliary storage device 103 is loaded into the memory 102 as needed.

The wireless communication module 104 is a module for wireless communication.

The network interface 105 is an interface to connect to the in-car LAN 219.

The timer 106 is an equipment to detect lapse of a set period.

The communication apparatus 100 includes elements such as the information management unit 110, the reception unit 121, the transmission unit 122 and the relay unit 123. These elements are realized by software.

The auxiliary storage device 103 stores a communication program to have a computer function as the information management unit 110, the reception unit 121, the transmission unit 122 and the relay unit 123. The communication program is loaded into the memory 102, and executed by the processor 101.

Further, the auxiliary storage device 103 stores an OS (Operating System). At least a part of the OS is loaded into the memory 102, and executed by the processor 101.

That is, the processor 101 executes the communication program while executing the OS.

The data obtained by executing the communication program is stored in a storage device such as the memory 102, the auxiliary storage device 103, a register in the processor 101 or a cache memory in the processor 101.

The memory 102 functions as the storage unit 131 and the buffer 132. However, another storage device may function as the storage unit 131 and the buffer 132 instead of the memory 102, or along with the memory 102.

The communication apparatus 100 may include a plurality of processors to replace the processor 101. The plurality of processors share the roles of the processor 101.

The communication program can be recorded (stored) on a non-volatile recording medium such as an optical disk or a flash memory, etc. in a computer-readable manner.

The configuration of the information management unit 110 will be described based on FIG. 3.

The information management unit 110 includes an information acquisition unit 111, a route set unit 112, a state determination unit 113, a mode determination unit 114 and a mode selection unit 115. These functions will be described later.

\*\*\*Description of Operation\*\*\*

The operation of the communication apparatus 100 corresponds to a communication method. Further, a procedure of the communication method corresponds to a procedure of the communication program.

An information management process will be described based on FIG. 4.

The information management process is a process by the information management unit 110.

In a step S101, the information acquisition unit 111 acquires navigation information.

The navigation information is route information, congestion information or position information.

Specifically, the information management unit 110 acquires the navigation information as follows.

First, the provision server 202 generates map information and congestion information by a conventional method.

The map information indicates a map of an area.

The congestion information indicates a generation status of traffic congestion in an area.

Further, the provision server 202 divides the area into sections that share common transmission speed, and generates transmission speed information.

The transmission speed information indicates transmission speed in each section. The transmission speed indicated in the transmission speed information is an expectation value of transmission speed, i.e., a rough standard of the transmission speed.

Then, the provision server 202 generates provision information including the map information, the congestion information and the transmission speed information, and transmits the provision information to the communication apparatus 100.

In the communication apparatus 100, the relay unit 123 receives the provision information, and transmits the received provision information to the car navigation device 211.

The car navigation device 211 receives the provision information and stores the received provision information in an internal memory.

Next, the car navigation device 211 determines a travel route of a vehicle based on the map information. The travel route is a route from a departure point to a destination.

The determination method of the travel route is the same as the method in a conventional car navigation system.

Next, the car navigation device 211 divides the travel route for every section. The travel route in each area is called a traveling section. That is, the car navigation device 211 divides the travel route into one or more traveling sections.

Next, the car navigation device 211 extracts the transmission speed of a section corresponding to each traveling section from the transmission speed information. The transmission speed of a section corresponding to a traveling section is called a transmission speed in the traveling section.

Next, the car navigation device 211 generates route information indicating a travel route and transmission speed of each traveling section, and transmits the route information to the communication apparatus 100.

Then, the information acquisition unit 111 receives the route information.

Next, the car navigation device 211 transmits the congestion information to the communication apparatus 100.

Then, the information acquisition unit 111 receives the congestion information.

Further, the car navigation device 211 transmits position information periodically to the communication apparatus 100. Then, the information acquisition unit 111 receives the position information periodically.

The position information indicates a position where a vehicle is traveling, that is, a current position of the vehicle. The position of the vehicle is measured by a GPS function. GPS is an abbreviation for Global Positioning System.

In a step S102, the information acquisition unit 111 judges a type of the acquired navigation information.

When the acquired navigation information is route information, the processing proceeds to a step S11.

When the acquired navigation information is congestion information, the processing proceeds to a step S121.

The acquired navigation information is position information, the processing proceeds to a step S131.

In a step S111, the route set unit 112 sets the acquired route information to the control table 310.

The route information indicates a travel route and transmission speed in each traveling section.

The travel route consists of one or more traveling sections.

For example, each traveling section is indicated by a starting position, an end position and a distance.

The travel route 301 will be described based on FIG. 5.

The travel route 301 is composed of six traveling sections from a first section through a sixth section. An n-th section is a travel route in an n-th area.

The route information of the travel route 301 indicates a starting position, an end position, a distance and a transmission speed for each traveling section from the first section through the sixth section.

The control table 310 will be described based on FIG. 6.

The control table 310 associates a section number, route information, a congestion state and a transmission mode with one another. "No." means a section number.

The control table 310 is stored in the storage unit 131.

The section number is a number to identify each traveling section.

The route information indicates a starting position, an end position, a distance and a transmission speed for each traveling section.

The starting position and the end position are indicated by coordinate values. For example, each of the starting position and the end position are indicated by a set of latitude and longitude.

The unit of the distance is, for example, meter.

The unit of the transmission speed is, for example, Mbps (Mega bits per second).

The congestion state indicates whether traffic congestion exists in each traveling section. For detail, see the following.

The transmission mode specifies a priority order in each traveling section on a plurality of types of vehicle information. For detail, see the following.

The route set unit 112 sets route information in a column of the route information. Further, the route set unit 112 sets a section number in a column of the section number.

Each column of the congestion information and the transmission mode are set in the following processing.

To return to FIG. 4, a step S121 will be described.

In the step S21, the state determination unit 113 determines a congestion state in each traveling section based on the acquired congestion information.

Specifically, the state determination unit 113 determines the congestion state in the traveling sections as follows.

First, the state determination unit 113 determines a section area corresponding to a traveling section. The section area is an area including a traveling section. For example, the state determination unit 113 calculates an area inside a range of a specified distance from a center of the traveling section, i.e., a round area with a radius of the specified distance. The area be calculated is the section area. The specified distance is a distance determined beforehand.

Then, the state determination unit 113 refers to the congestion information, and judges whether traffic congestion occurs in at least a part of the section area.

When traffic congestion occurs in at least a part of the section area, the traveling section is in a state wherein traffic congestion occurs.

When traffic congestion does not occur in the section area, the traveling section is in a state wherein no traffic congestion occurs.

Then, the state determination unit 113 sets a congestion state in each traveling section in the control table 310.

In a step S122, the mode determination unit 114 acquires from the control table 310 transmission speed in each traveling section, and a congestion state in each traveling section.

Then, the mode determination unit 114 determines a transmission mode in each traveling section based on the transmission speed in each traveling section and the congestion state in each traveling section.

Specifically, the mode determination unit 114 determines a transmission mode in each traveling section based on the transmission speed in each traveling section, the congestion state in each traveling section and a mode determination condition 320.

The mode determination condition 320 is indicated in FIG. 7. The mode determination condition 320 is stored in the storage unit 131.

There are three types of transmission modes, i.e. a first transmission mode, a second transmission mode and a third transmission mode.

The first transmission mode is a "low-rate" mode.

The second transmission mode is a "normal" mode.

The third transmission mode is an "acceleration" mode.

The "low-rate" mode, the "normal" mode and the "acceleration" mode will be described below in detail.

When a transmission speed in a traveling section is smaller than a reference speed, the mode determination unit 114 determines a transmission mode in a traveling section as the "low-rate" mode irrespective of a congestion state in the traveling section.

The reference speed is a transmission speed determined beforehand.

When the transmission speed in the traveling section is equal to or more than the reference speed, and the congestion state in the traveling section is "present", the mode determination unit 114 determines the transmission mode in the traveling section as the "normal" mode.

When the transmission speed in the traveling section is equal to or more than the reference speed, and the congestion state in the traveling section is "absent", the mode determination unit 114 judges whether at least a part of the traveling section is included in an adjustment section. The adjustment section will be described below.

When at least a part of the traveling section is included in the adjustment section, the mode determination unit 114 determines the transmission mode in the traveling section as the "acceleration" mode.

When at least a part of the traveling section is not included in the adjustment section, the mode determination unit 114 determines the transmission mode in the traveling section as the "normal" mode.

The adjustment section is a section adjacent to the traveling section in the "low-rate" mode, having an adjustment section length. The adjustment section length is a distance determined beforehand.

Figure 8:
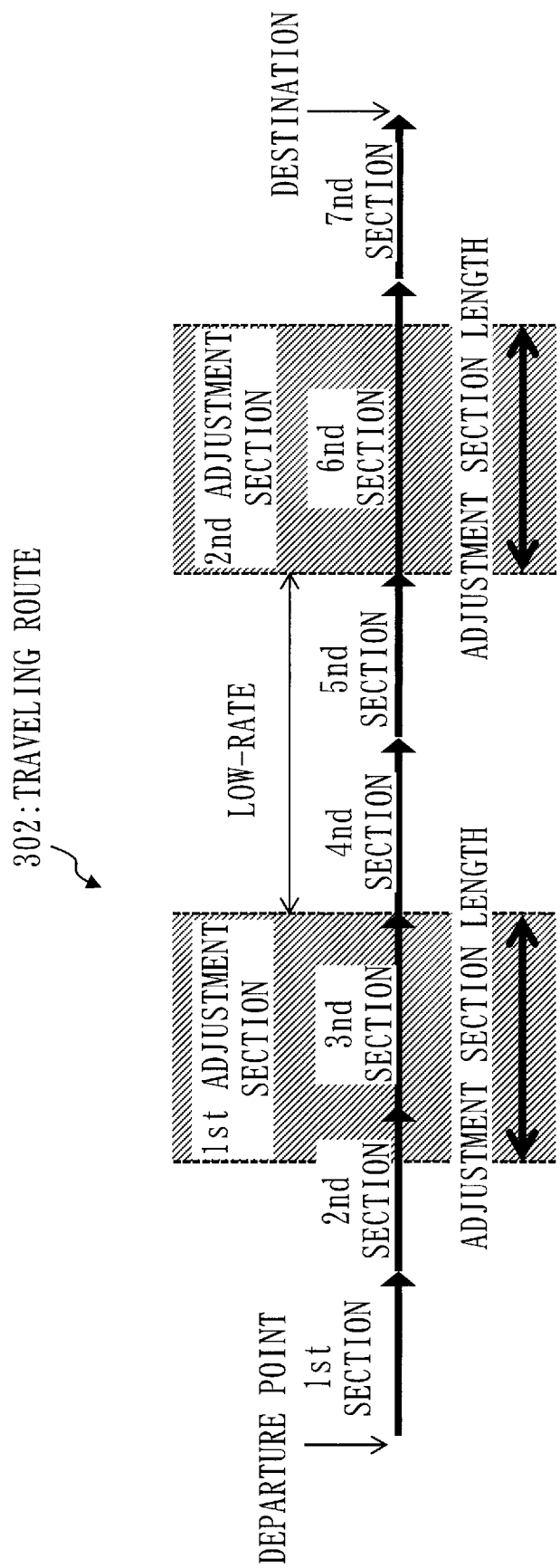
FIG. 8 is a diagram illustrating a travel route 302 according to the first embodiment.

An adjustment section of a travel route 302 will be described based on FIG. 8.

The travel route 302 is composed of seven traveling sections from a first section through a seventh section.

The fourth section and the fifth section are traveling sections in the "low-rate" mode.

A first adjustment section is located immediately in front of the fourth section, having an adjustment section length. The first adjustment section includes a part of the second section and the third section.

A second adjustment section is located immediately behind the fifth section, having an adjustment section length. The second adjustment section includes a part of the sixth section.

In each traveling section of the first section, the second section, the third section, the sixth section and the seventh section, when the transmission speed is equal to or more than the reference speed, and the congestion state is "absent", transmission modes in each traveling section are as follows.

The transmission mode in the first section is "normal".

The transmission mode in the second section is "acceleration".

The transmission mode in the third section is "acceleration".

The transmission mode in the sixth section is "acceleration".

The transmission mode in the seventh section is "normal".

To return to FIG. 4, explanation of the step S122 is continued.

The mode determination unit 114 sets the transmission modes in each traveling section in the control table 310.

Next, the step S131 through a step S133 will be described.

In the step S131, the mode selection unit 115 selects a transmission mode at a position indicated by the acquired position information, from the transmission modes in each traveling section. The transmission mode be selected is called a pertinent transmission mode.

Specifically, the mode selection unit 115 selects the pertinent transmission mode in a manner as follows.

First, the mode selection unit 115 refers to the control table 310, and selects a traveling section to which the position indicated by the position information belongs, from route information.

Then, the mode selection unit 115 acquires a transmission mode in the selected traveling section, from the control table 310. The transmission mode be acquired is the pertinent transmission mode.

In the step S132, the mode selection unit 115 judges whether the pertinent transmission mode is the same as a transmission mode of a previous time. A case wherein the pertinent transmission mode is different from the transmission mode of the previous time is called mode change.

In a case of mode change, the processing proceeds to the step S133.

In a case of not being the mode change, the processing ends.

In the step S133, the mode selection unit 115 notifies the transmission unit 122 of a transmission mode.

Next, the operation of the transmission unit 122 will be described.

The transmission unit 122 acquires various types of vehicle information from the buffer 132 in accordance with the priority order specified by the notified transmission mode, and transmits various types of the vehicle information in the acquired order.

Figure 9:
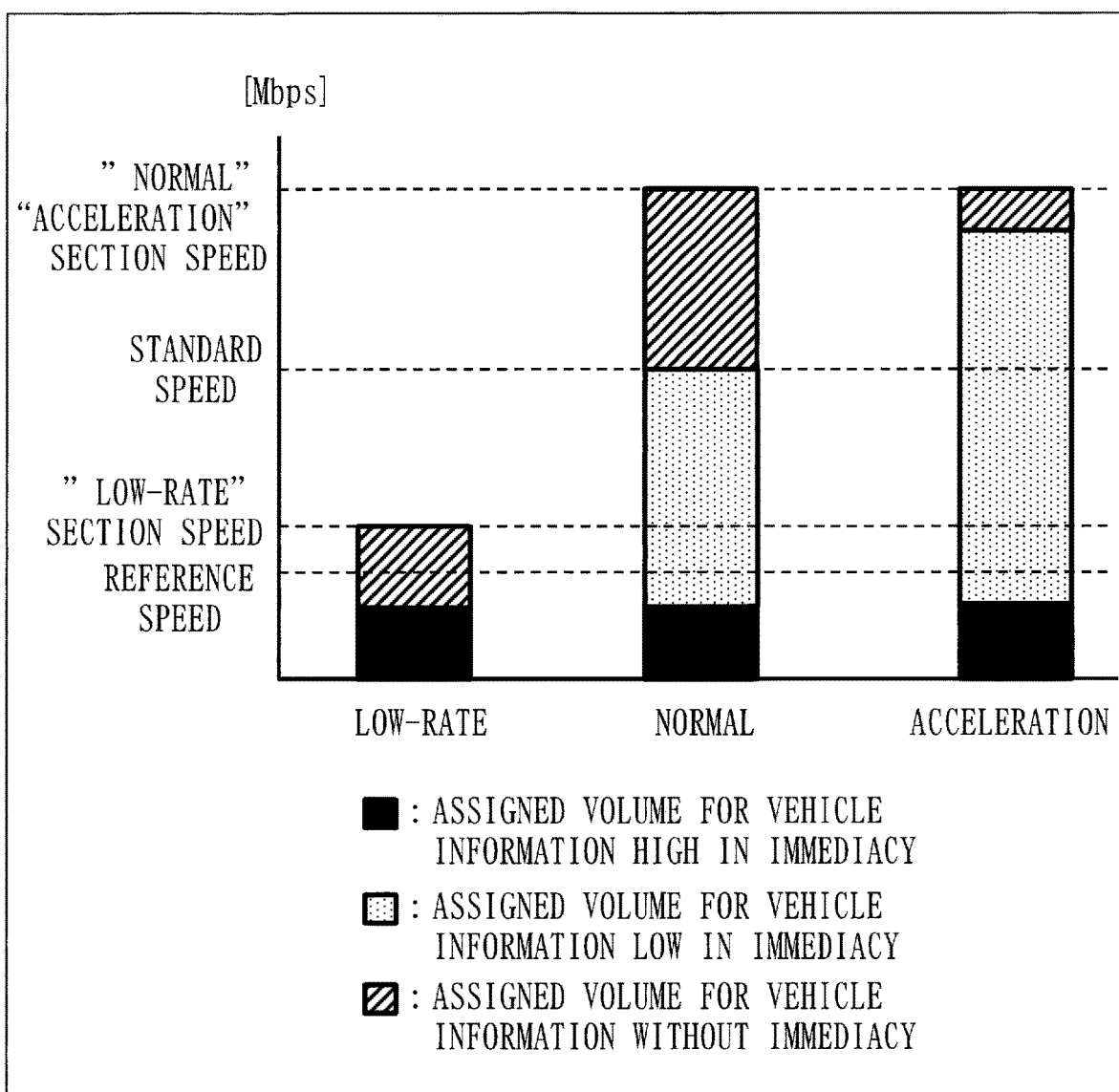
FIG. 9 is a diagram illustrating a transmission assigned volume for each type of vehicle information according to the first embodiment.

FIG. 9 indicates a transmission volume assigned to various types of vehicle information.

"XX" section speed means a transmission speed in a traveling section in an "XX" mode.

A standard speed is a transmission speed determined beforehand, and is a transmission speed smaller than a "normal" section speed and a "high-rate" section speed.

The "low-rate" mode is a transmission mode wherein vehicle information high in immediacy is preferentially transmitted, vehicle information without immediacy is transmitted in a remaining range of the communication volume in the traveling section, and vehicle information low in immediacy is not transmitted. The communication volume in the traveling section means a communication volume corresponding to the transmission speed in the traveling section.

The "normal" mode is a transmission mode wherein vehicle information high in immediacy is preferentially transmitted, vehicle information low in immediacy is transmitted in a remaining range of a standard volume lower than the communication volume in the traveling section, and vehicle information without immediacy is transmitted in the remaining range of the communication volume in the traveling section. The standard volume means a communication volume corresponding to the standard speed.

The "acceleration" mode is a transmission mode wherein vehicle information high in immediacy is preferentially transmitted, vehicle information low in immediacy is transmitted in the remaining range of the communication volume in the traveling section, and vehicle information without immediacy is transmitted in the remaining range after the vehicle information low in immediacy is transmitted.

In the "low-rate" mode, the transmission unit 122 preferentially transmits vehicle information high in immediacy. Next, the transmission unit 122 transmits vehicle information without immediacy in the remaining range of the communication volume in the traveling section. The transmission unit 122 does not transmit vehicle information low in immediacy.

In the "normal" mode, the transmission unit 122 preferentially transmits vehicle information high in immediacy. Next, the transmission unit 122 transmits vehicle information low in immediacy in the remaining range of the standard volume smaller than the communication volume in the traveling section. Next, the transmission unit 122 transmits vehicle information without immediacy in the remaining range of the communication volume in the traveling section.

In the "acceleration" mode, the transmission unit 122 preferentially transmits the vehicle information high in immediacy. Next, the transmission unit 122 transmits the vehicle information low in immediacy in the remaining range of the communication volume in the traveling section. Then, the transmission unit 122 transmits the vehicle information low in immediacy in the remaining range in the communication volume in the traveling section. Next, the transmission unit 122 transmits the vehicle information without immediacy in the remaining range after the vehicle information low in immediacy is transmitted.

Figure 10:
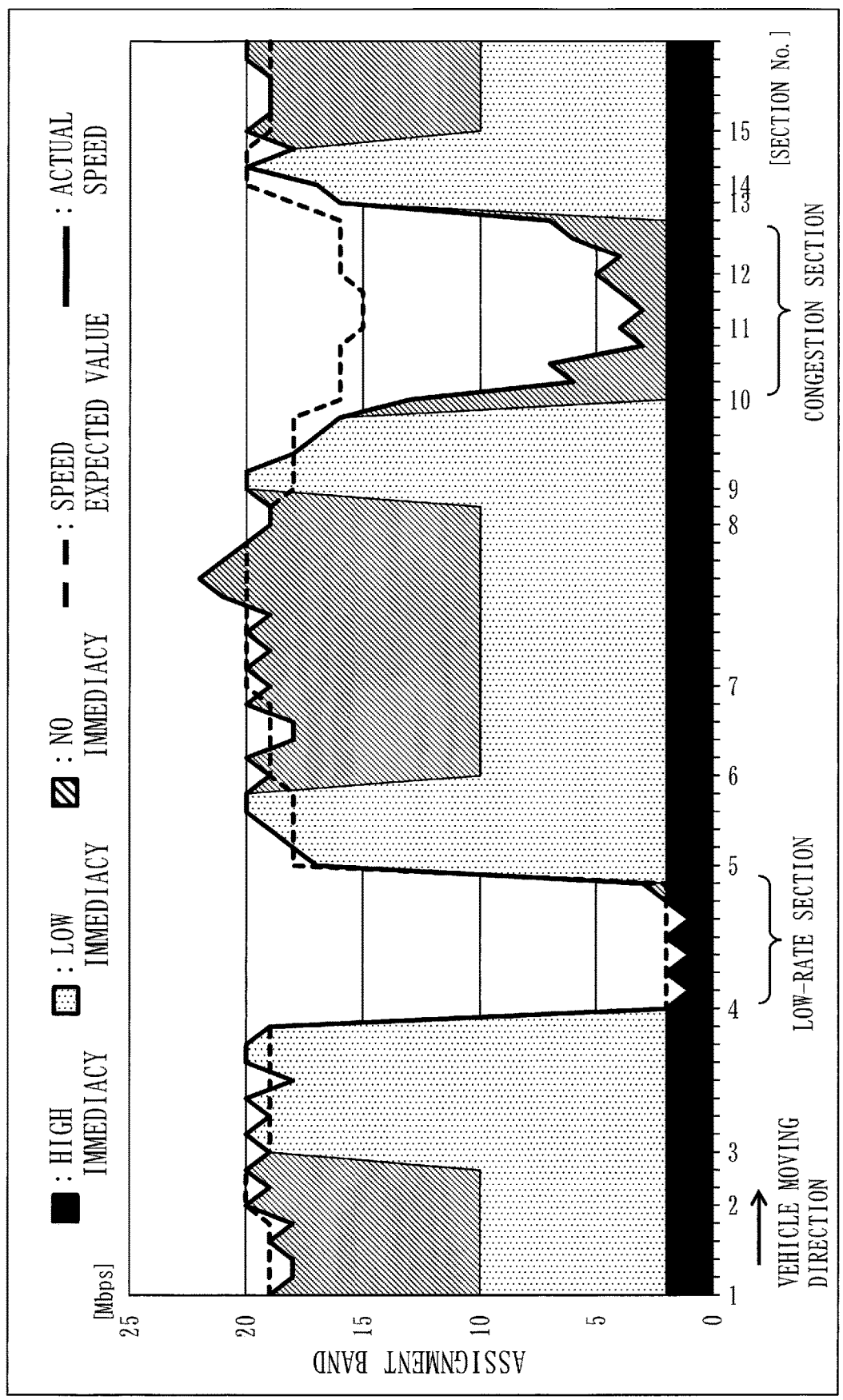
FIG. 10 is a diagram illustrating a transmission volume of each type of vehicle information according to the first embodiment.

FIG. 10 illustrates an assignment band corresponding to the control table 310 (refer to FIG. 6).

The assignment band is a communication band assigned to each type of vehicle information. The assignment band corresponds to a transmission volume assigned to each type of vehicle information.

An expected speed value is an expected value of the transmission speed in each traveling section.

An actual speed is an actual transmission speed in each traveling section.

A low-rate section is a section where the transmission speed is lower than the reference speed. In the low-rate section, a communication error occurs.

A congestion section is a section where traffic congestion occurs. In the congestion section, communication congestion occurs.

"Section No." is a number of a traveling section.

The fourth section is a low-rate section. Therefore, a transmission mode in the fourth section is a "low-rate" mode. In the fourth section, the transmission unit 122 preferentially transmits the vehicle information high in immediacy rather than the vehicle information without immediacy. In the fourth section, the transmission unit 122 does not transmit the vehicle information low in immediacy.

Since the third section is located immediately in front of the low-rate section, the third section corresponds to a first adjustment section. Therefore, the transmission mode in the third section is an "acceleration" mode. In the third section, the transmission unit 122 preferentially transmits the vehicle information low in immediacy occurred before the vehicle enters the low-rate section rather than the vehicle information without immediacy.

The fifth section is located immediately behind the low-rate section, the fifth section corresponds to the second adjustment section. Therefore, the transmission mode in the fifth section is an "acceleration" mode.

In the fifth section, the transmission unit 122 preferentially transmits the vehicle information low in immediacy occurred while the vehicle is traveling through the low-rate section rather than the vehicle information without immediacy.

The transmission mode in the congestion section is the "low-rate" mode or the "normal" mode. In the congestion section, the transmission unit 122 preferentially transmits the vehicle information high in immediacy rather than the vehicle information low in immediacy and the vehicle information without immediacy.

Since the ninth section is located immediately in front of the congestion section, the ninth section corresponds to the first adjustment section. Therefore, the transmission mode in the ninth section is "acceleration". In the ninth section, the transmission unit 122 preferentially transmits the vehicle information low in immediacy that has occurred before the vehicle enters the congestion section rather than the vehicle information without immediacy.

Since the 13$^{th}$ section is located immediately behind the congestion section, the 13$^{th}$ section corresponds to the second adjustment section. Therefore, the transmission mode in the 13$^{th}$ section is an "acceleration" mode. In the 13$^{th}$ section, the transmission unit 122 preferentially transmits the vehicle information low in immediacy that has occurred while the vehicle is traveling through the congestion section rather than the vehicle information without immediacy.

That is, the transmission unit 122 transmits the vehicle information low in immediacy that has occurred before the vehicle enters the traveling section in the "low-rate" mode, in the first adjustment section immediately in front of the traveling section of the "low-rate" mode.

Further, the transmission unit 122 transmits the vehicle information low in immediacy that has occurred while the vehicle travels through the traveling section of the "low-rate" mode in the second adjustment section immediately behind the traveling section of the "low-rate" mode without transmitting the same in the traveling section of the "low-rate" mode.

*Effect of First Embodiment*

It is possible to efficiently transmit vehicle information.

In a section where the transmission speed is slow, transmission of the information low in immediacy is stopped, and the information high in immediacy is preferentially transmitted. Meanwhile, the information low in immediacy stored in a buffer is preferentially transmitted before a vehicle reaches the section where the transmission speed is slow. Further, after the vehicle passes the section where the transmission speed is slow, the information low in immediacy that has occurred during passage through the section where the transmission speed is slow is preferentially transmitted. This makes it possible to prevent delay in transmission of the information high in immediacy while the vehicle is passing through the section where the transmission speed is slow. Further, it is possible to reduce delay in transmission of the information low in immediacy.

A section where a plurality of vehicles gather due to traffic congestion is regarded as a section where the transmission speed is slow. Therefore, in a section where communication congestion occurs since a plurality of vehicles transmitting information densely concentrate, it is possible to prevent delay in transmission of information high in immediacy. Further, it is possible to reduce delay in transmission of the information low in immediacy.

The section where traffic congestion occurs within a prescribed distance is regarded as a section where the transmission speed is low. For example, even a section where a traffic lane (a reverse lane or a parallel running lane) different from a lane through which the vehicle travels is congested is regarded as a section where the transmission speed is slow. Further, for example, a section that crosses a road where traffic congestion occurs at an intersection is also regarded as a section where the transmission speed is slow. This makes it possible to prevent delay in transmission of the information high in immediacy. Further, it is possible to reduce delay in transmission of the information low in immediacy.

*Other Configurations*

The mode determination unit 114 may determine a transmission mode in each traveling section based on a transmission speed in each traveling section regardless of a congestion state in each traveling section.

For example, the mode determination unit 114 determines a transmission mode in each traveling section in accordance with a condition in a case of the congestion state being "absent" in the mode determination condition 320 (refer to FIG. 7).

Each information included in provision information may be transmitted from an object other than the provision server 202.

For example, the congestion information may be transmitted from another vehicle by inter-vehicle communication.

Second Embodiment

An embodiment wherein a wireless communication device is used will be described mainly on differences from the first embodiment based on FIG. 1 through FIG. 13.

*Explanation of Configuration*

Figure 11:
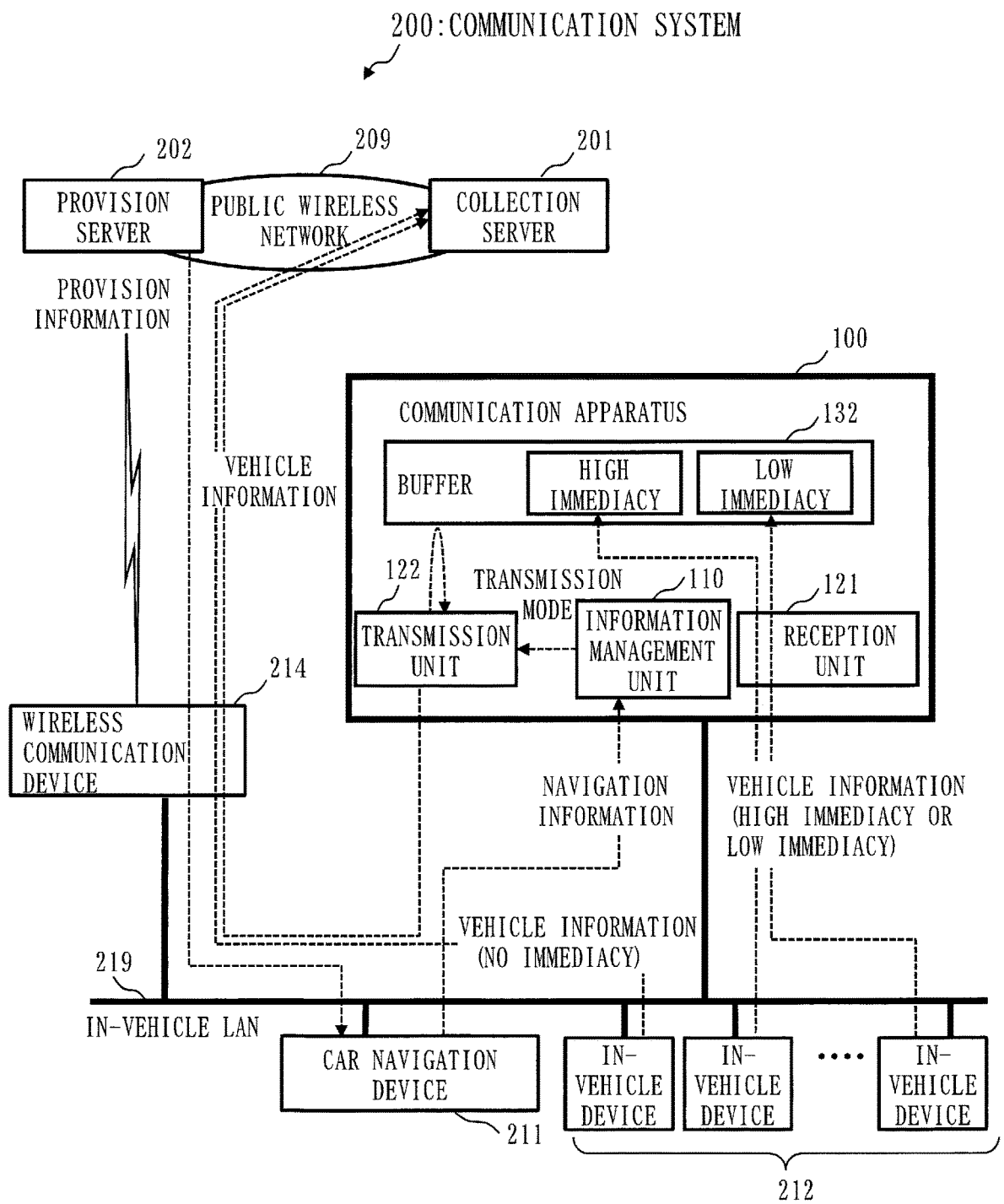
FIG. 11 is a configuration diagram of a communication system 200 according to a second embodiment.

The configuration of the communication system 200 will be described based on FIG. 11.

The communication system 200 includes a wireless communication device 214.

The wireless communication device 214 is mounted on a vehicle, and is connected to the in-vehicle LAN 219.

The in-vehicle device 212 transmits the vehicle information high in immediacy and the vehicle information low in immediacy to the communication apparatus 100.

The reception unit 121 receives the vehicle information high in immediacy and the vehicle information low in immediacy, and stores the same in the buffer 132.

The transmission unit 122 acquires the vehicle information high in immediacy and the vehicle information low in immediacy from the buffer 132 in accordance with a priority order specified in a transmission mode, and transmits each vehicle information to the wireless communication device 214 in the acquired order.

The in-vehicle device 212 transmits the vehicle information without immediacy to the wireless communication device 214.

The wireless communication device 214 receives the vehicle information and transmits the received vehicle information to the collection server 201.

The wireless communication device 214 receives the provision information from the provision server 202, and transmits the received provision information to the car navigation device 211.

The car navigation device 211 receives the provision information via the wireless communication device 214.

Figure 12:
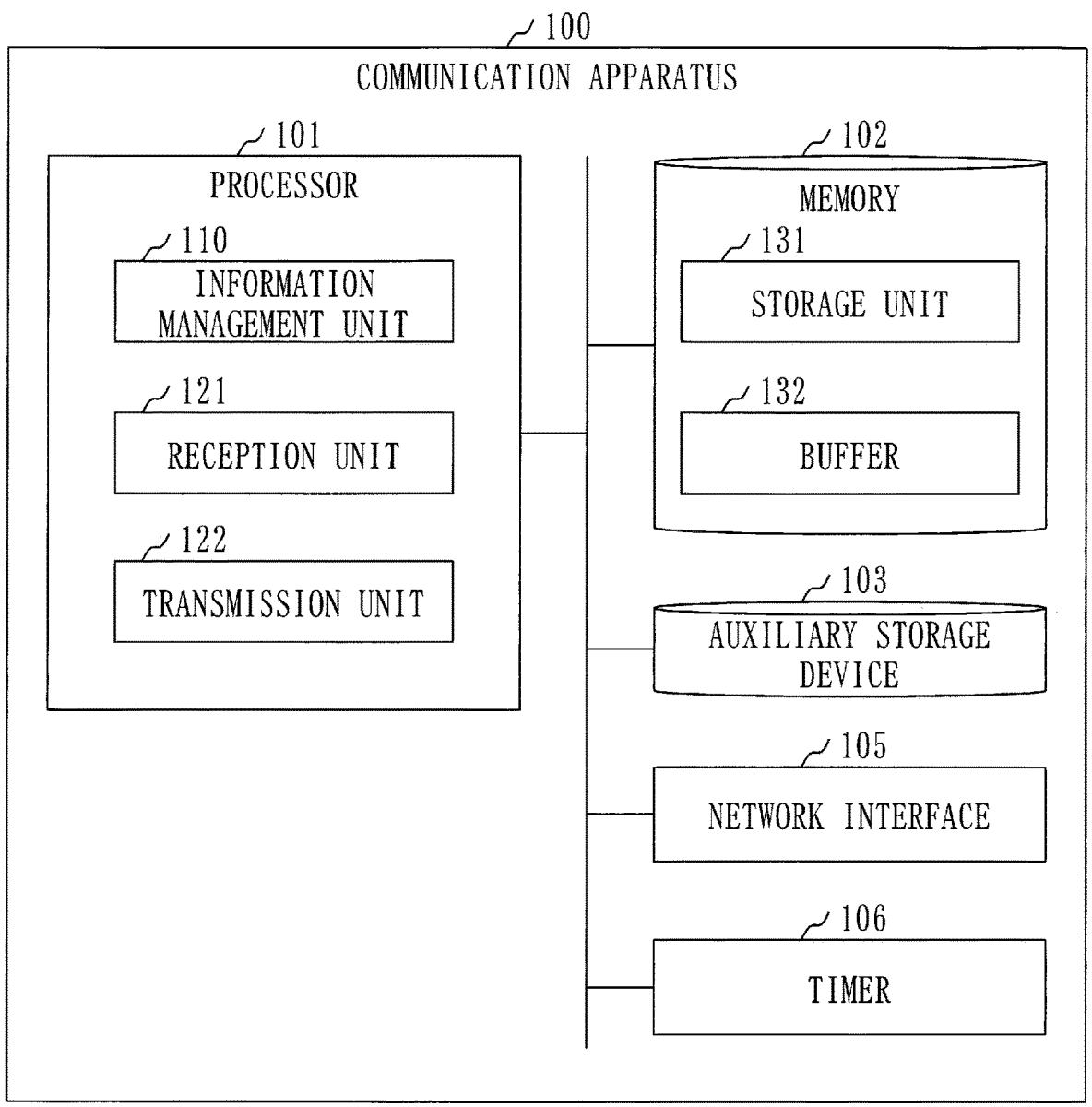
FIG. 12 is a configuration diagram of a communication apparatus 100 according to the second embodiment.

The configuration of the communication apparatus 100 will be described based on FIG. 12.

Figure 2:
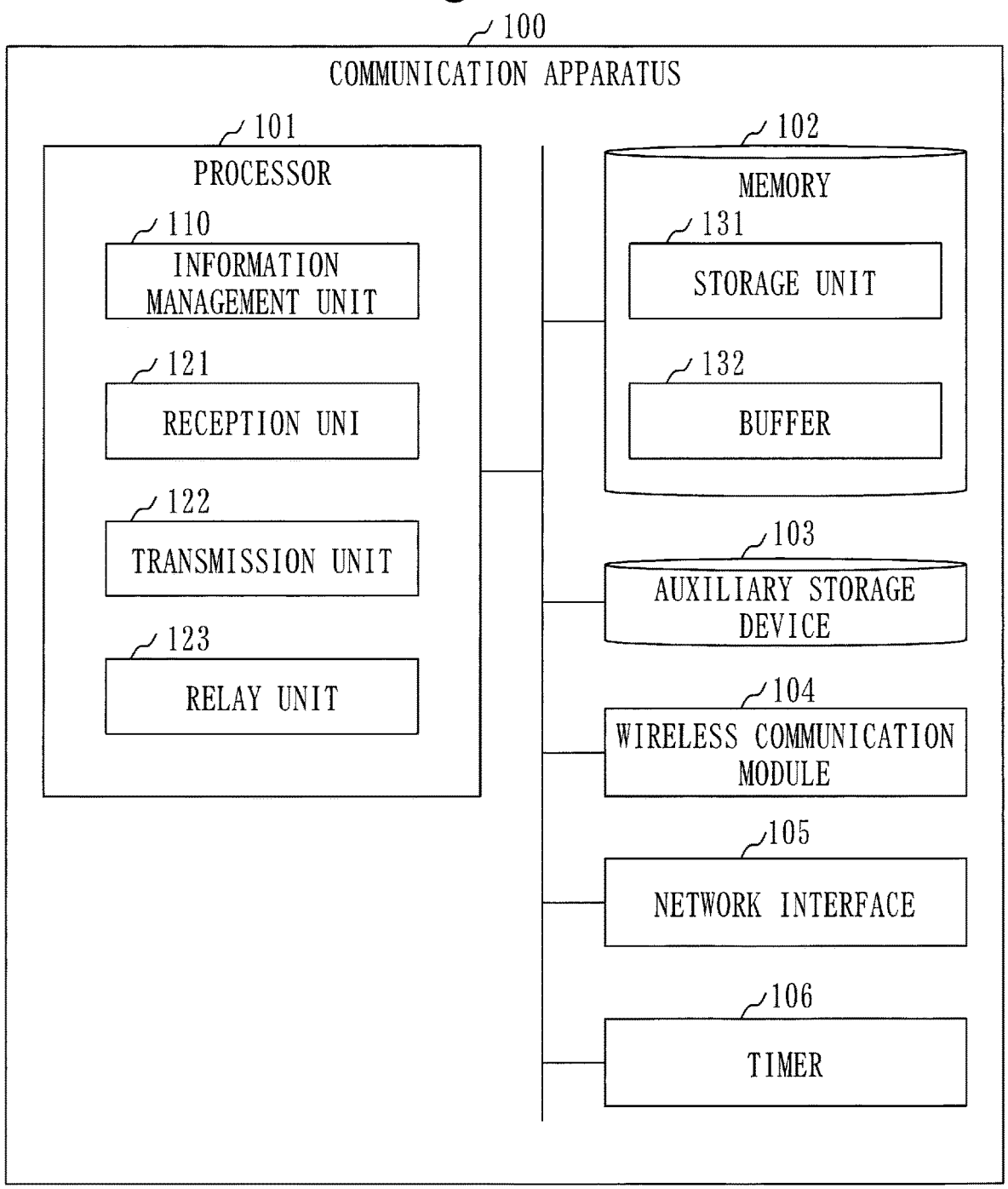
FIG. 2 is a configuration diagram of a communication apparatus 100 according to the first embodiment.

The communication apparatus 100 does not include the relay unit 123 and the wireless communication module 104 of the configuration in the first embodiment (refer to FIG. 2).

*Explanation of Operation*

An information management process is the same as the process in the first embodiment (refer to FIG. 4).

The operation of the transmission unit 122 will be described.

The transmission unit 122 acquires various types of vehicle information from the buffer 132 in accordance with a priority order specified in a notified transmission mode, and transmits various types of vehicle information in the acquired order. The transmitted vehicle information is received by the wireless communication device 214, and transmitted to the collection server 201 by the wireless communication device 214.

Figure 13:
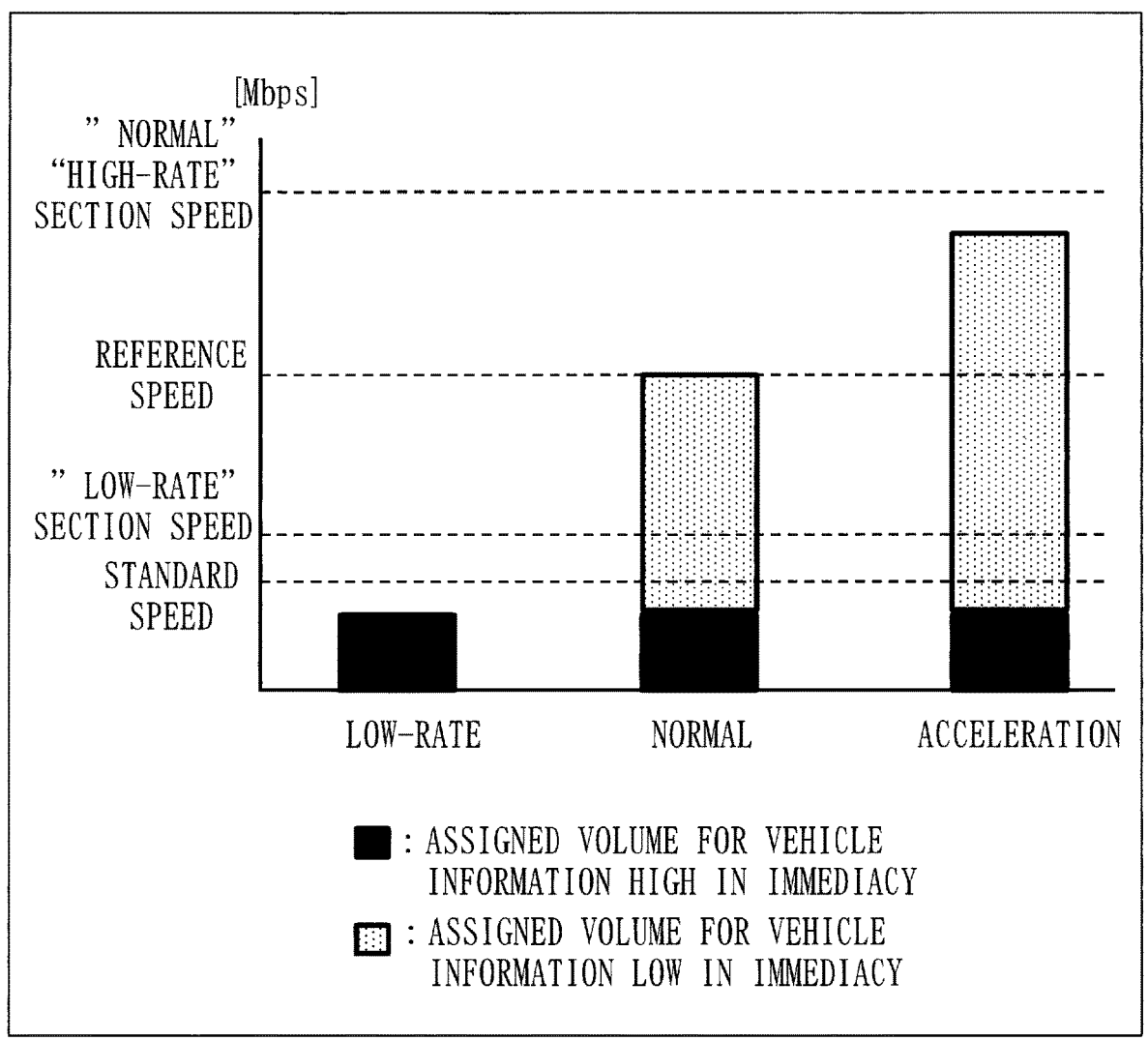
FIG. 13 is a diagram illustrating a transmission assigned volume for each type of vehicle information according to the second embodiment.

FIG. 13 indicates a communication volume assigned to several types of vehicle information.

In the "low-rate" mode, the transmission unit 122 preferentially transmits the vehicle information high in immediacy. The transmission unit does not transmit the vehicle information low in immediacy.

In the "normal" mode, the transmission unit 122 preferentially transmits the vehicle information high in immediacy. Next, the transmission unit 122 transmits the vehicle information low in immediacy in the remaining range of the standard volume smaller than the communication volume in the traveling section.

In the "acceleration" mode, the transmission unit 122 preferentially transmits the vehicle information high in immediacy. Next, the transmission unit 122 transmits the vehicle information low in immediacy in the remaining range of the communication volume in the traveling section.

The operation of the wireless communication device 214 will be described.

The wireless communication device 214 transmits several types of vehicle information. The transmitted vehicle information is received by the collection server 201.

Specifically, the wireless communication device 214 preferentially transmits the vehicle information high in immediacy and the vehicle information low in immediacy rather than the vehicle information without immediacy.

In the "low-rate" mode, the wireless communication device 214 preferentially transmits the vehicle information high in immediacy. Next, the wireless communication device 214 transmits the vehicle information without immediacy in the remaining range of the communication volume in the traveling section. The wireless communication device 214 does not transmit the vehicle information low in immediacy.

In the "normal" mode, the wireless communication device 214 preferentially transmits the vehicle information high in immediacy. Next, the wireless communication device 214 transmits the vehicle information low in immediacy in the remaining range of the standard volume smaller than the communication volume in the traveling section. Next, the wireless communication device 214 transmits the vehicle information without immediacy in the remaining range of the communication volume in the traveling section.

In the "acceleration" mode, the wireless communication device 214 preferentially transmits the vehicle information high in immediacy. Next, the wireless communication device 214 transmits the vehicle information low in immediacy in the remaining range of the communication volume in the traveling section. Next, the wireless communication device 214 transmits the vehicle information without immediacy in the remaining range after the vehicle information low in immediacy has been transmitted.

*Effect of Second Embodiment*

In a mode wherein the wireless communication device 214 is used for communication with a public wireless network 209, a similar effect as that of the first embodiment is obtained.

Third Embodiment

Explanation will be provided of a mode wherein a transmission mode is determined based on a communication state in the past in a traveling section mainly on differences from the first embodiment based on FIG. 14 through FIG. 20.

*Explanation of Configuration*

Figure 14:
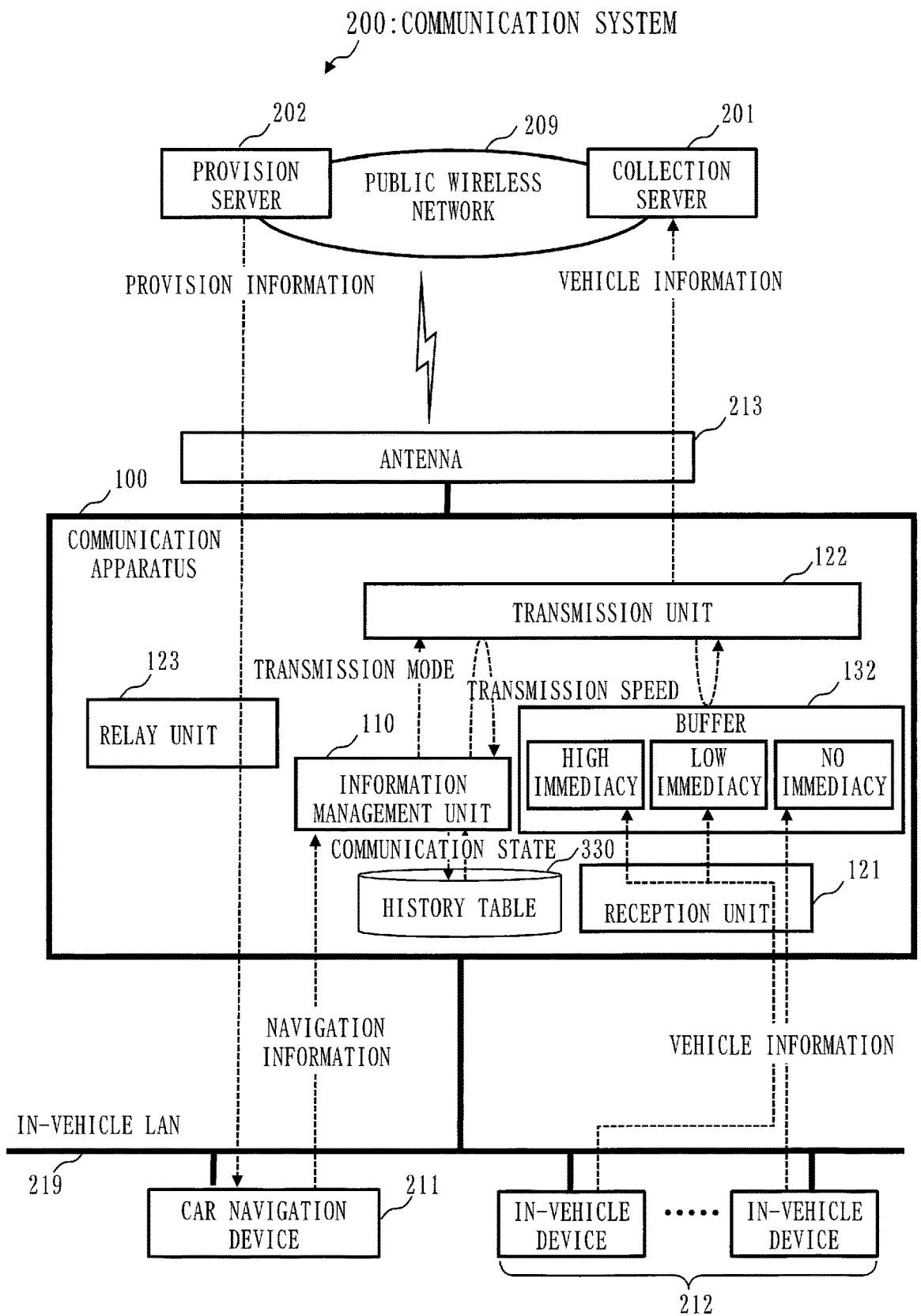
FIG. 14 is a configuration diagram of a communication system 200 according to a third embodiment.

The configuration of the communication system 200 will be described based on FIG. 14.

The communication system 200 includes the communication apparatus 100.

The communication apparatus 100 has features as follows.

The transmission unit 122 acquires a transmission speed from the wireless communication module 104 in each traveling position. Then, the transmission unit 122 notifies the information management unit 110 of the transmission speed in each traveling position.

The information management unit 110 judges a communication state in each section based on the transmission speed in each traveling position. Then, the information management unit 110 registers the communication state in each section in a history table 330. The history table 330 will be described later.

Figure 15:
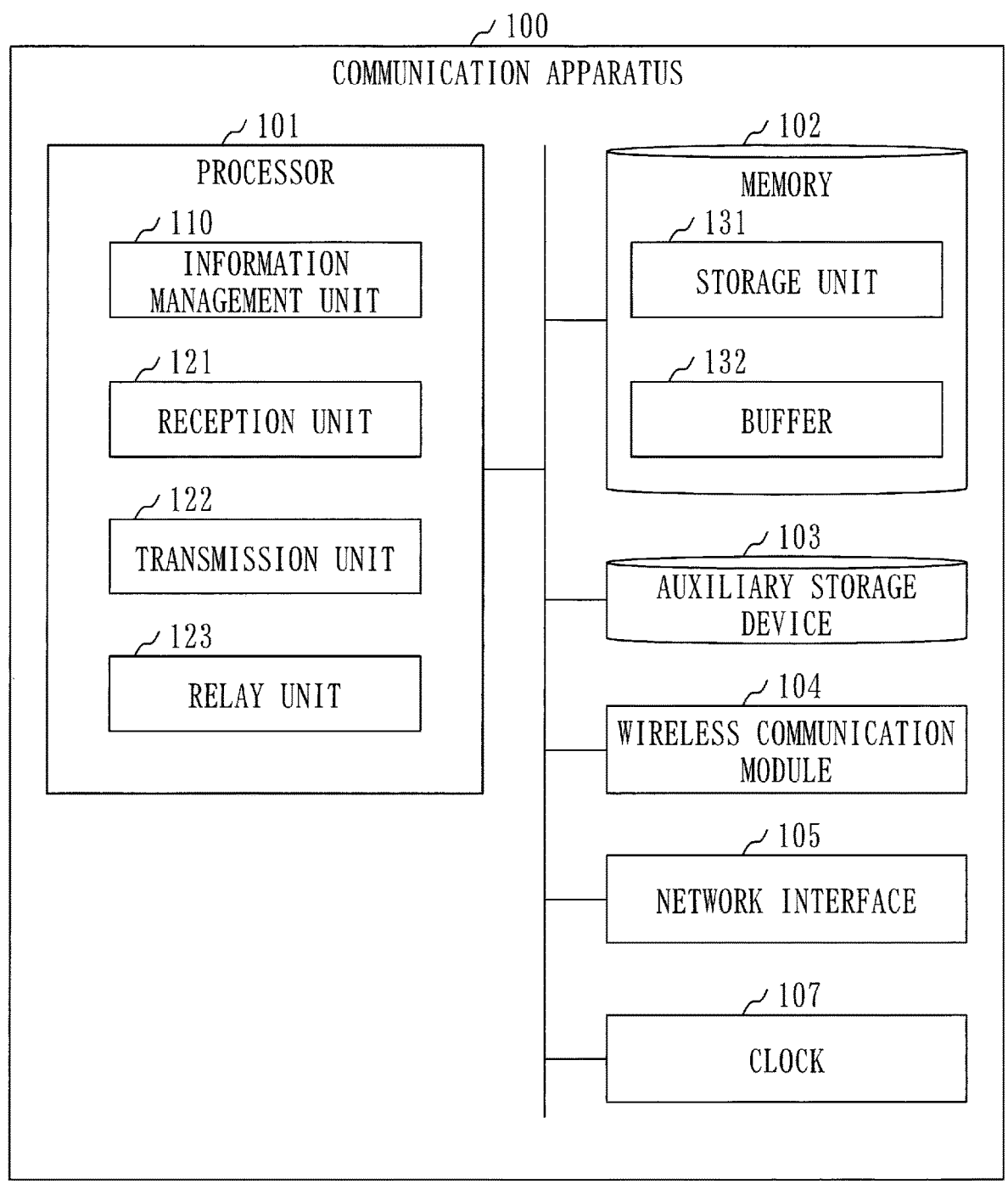
FIG. 15 is a configuration diagram of a communication apparatus 100 according to the third embodiment.

The configuration of the communication apparatus 100 will be described based on FIG. 15.

The communication apparatus 100 includes a clock 107 instead of the timer 106 included in the first embodiment (refer to FIG. 2).

The clock 107 is a clock that outputs a current time. For example, the current time is denoted by year, month, day, hour, and minute.

Figure 16:
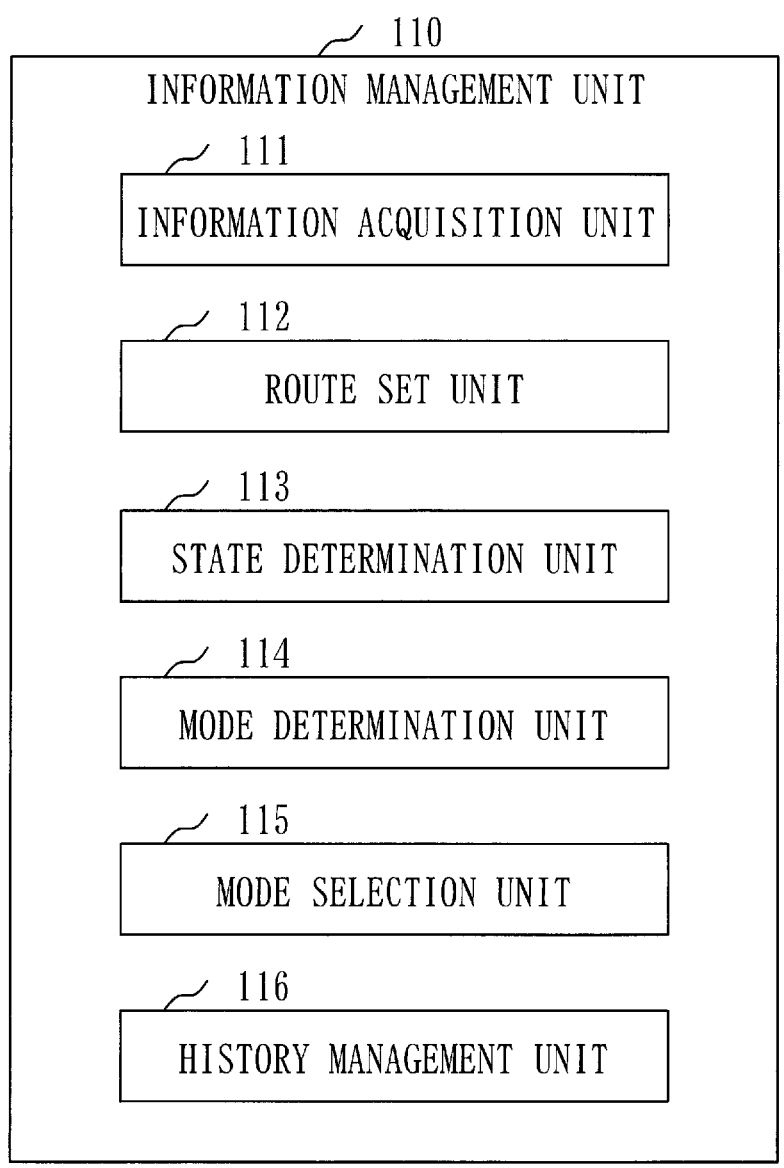
FIG. 16 is a configuration diagram of an information management unit 110 according to the third embodiment.

The configuration of the information management unit 110 will be described based on FIG. 16.

The information management unit 110 includes a history management unit 116 in addition to the configuration in the first embodiment (refer to FIG. 3).

*Explanation of Operation*

An information management process will be described based on FIG. 17.

In a step S101, the information acquisition unit 111 acquires navigation information.

The step S101 is the same as that described in the first embodiment (refer to FIG. 4).

In a step S102, the information acquisition unit 111 judges the type of the acquired navigation information.

The step S102 is the same as that described in the first embodiment (refer to FIG. 4).

When the acquired navigation information is route information, the processing proceeds to a step S111.

When the acquired navigation information is congestion information, the processing proceeds to a step S121.

When the acquired navigation information is position information, the processing proceeds to the step S131.

In the step S111, the route set unit 112 sets the acquired route information to the control table 310.

The step S111 is the same as that described in the first embodiment (refer to FIG. 4).

The configuration of the control table 310 is partially different from the configuration in the first embodiment.

The control table 310 will be described based on FIG. 18.

The control table 310 includes a column of history existence/absence in addition to columns of each element in the first embodiment (refer to FIG. 6).

The history existence/absence indicates existence or absence of history information corresponding to each traveling section.

The column of history existence/absence is set in a following process.

To return to FIG. 17, explanation is continued.

After the step S111, the processing proceeds to a step S301.

In the step S301, the history management unit 116 judges whether the history information corresponding to each traveling section is registered in the history table 330. The history information corresponding to each traveling section is history information of a section to which each traveling section belongs.

Then, the history management unit 116 sets each judgement result in the column of the history existence/absence in the control table 310.

After the step S301, the processing ends.

Next, a step S121 and a step S302 will be described.

In the step S121, the state determination unit 113 determines a congestion state in each traveling section based on the acquired congestion information.

The step S121 is the same as that described in the first embodiment (refer to FIG. 4).

After the step S121, the processing proceeds to the step S302.

In the step S302, the mode determination unit 114 determines a transmission mode in each traveling section based on a transmission speed in each traveling section, a congestion state in each traveling section and the history table 330.

The history table 330 indicates a section where the transmission speed is smaller than a reference speed. The section where the transmission speed is smaller than the reference speed is called a low-rate section.

Specifically, the mode determination unit 114 judges whether each traveling section is a section corresponding to the low-rate section based on the history table 330. Then, the mode determination unit 114 determines a transmission mode in the traveling section corresponding to the low-rate section as the "low-rate" mode irrespective of the transmission speed and the congestion state. Further, the mode determination unit 114 determines a transmission mode in a traveling section other than the traveling section corresponding to the low-rate section based on the transmission speed and the congestion state.

The history table 330 will be described based on FIG. 19. The history table 330 is stored in the storage unit 131.

The history table 330 includes history information in each section.

The history information indicates a starting position, an end position, a detection time and a communication state.

The starting position is a position of a starting point of a section that shares a communication state. The starting position is denoted by coordinate values. For example, the starting position is denoted by a set of latitude and longitude.

The end position is a position of an end position of the section that shares the communication state. The end position is denoted by coordinate values. For example, the end position is denoted by a set of latitude and longitude.

The detection time is a time when the section that shares the communication state is detected. For example, the detection time is denoted by year, month, day, hour, and minute.

The communication state is a state of communication in a section that shares a communication state. "Error" means that the pertinent section is a low-rate section.

To return to FIG. 17, explanation of the step S302 is continued.

The procedure of the step S302 will be described based on the control table 310 and the history table 330.

The mode determination unit 114 refers to the column of the history existence/absence in the control table 310, and judges whether history information corresponding to a traveling section is registered in the history table 330.

When the history information corresponding to the traveling section is registered in the history table 330, the mode determination unit 114 selects the history information corresponding to the traveling section from the history table 330, and refers to a communication state in the selected history information.

When the communication state is "error", the mode determination unit 114 determines a transmission mode in a traveling section as the "low-rate" mode.

When the communication state is not "error", the mode determination unit 114 determines a transmission mode in the traveling section in accordance with the mode determination condition 320. The determination method is the same as the method in the first embodiment (refer to the step S122 in FIG. 4).

When the history information corresponding to the traveling section is not registered in the history table 330, the mode determination unit 114 determines a transmission mode in the traveling section in accordance with the mode determination condition 320. The determination method is the same as the method in the first embodiment (refer to the step S122 in FIG. 4).

The processing ends after the step S302.

Next, explanation will be provided of a step S131 through a step S133, and a step S310.

In the step S131, the mode selection unit 115 selects a transmission mode at a position indicated by the acquired position information from transmission modes of each traveling section. The transmission mode be selected is called a pertinent transmission mode.

The step S131 is the same as that described in the first embodiment (refer to FIG. 4).

In the step S132, the mode selection unit 115 judges whether the pertinent transmission mode is the same as a previous transmission mode. When the pertinent transmission mode is different from the previous transmission mode, it is called mode change.

The step S132 is the same as that described in the first embodiment (refer to FIG. 4).

In a case of mode change, the processing proceeds to the step S133.

If the case is not mode change, the processing proceeds to the step S310.

In the step S133, the mode selection unit 115 notifies the transmission unit 122 of a transmission mode.

The step S133 is the same as that described in the first embodiment (refer to FIG. 4).

After the step S133, the processing proceeds to the step S310.

In the step S310, the history management unit 116 updates the history table 330.

After the step S310, the processing ends.

Figure 20:
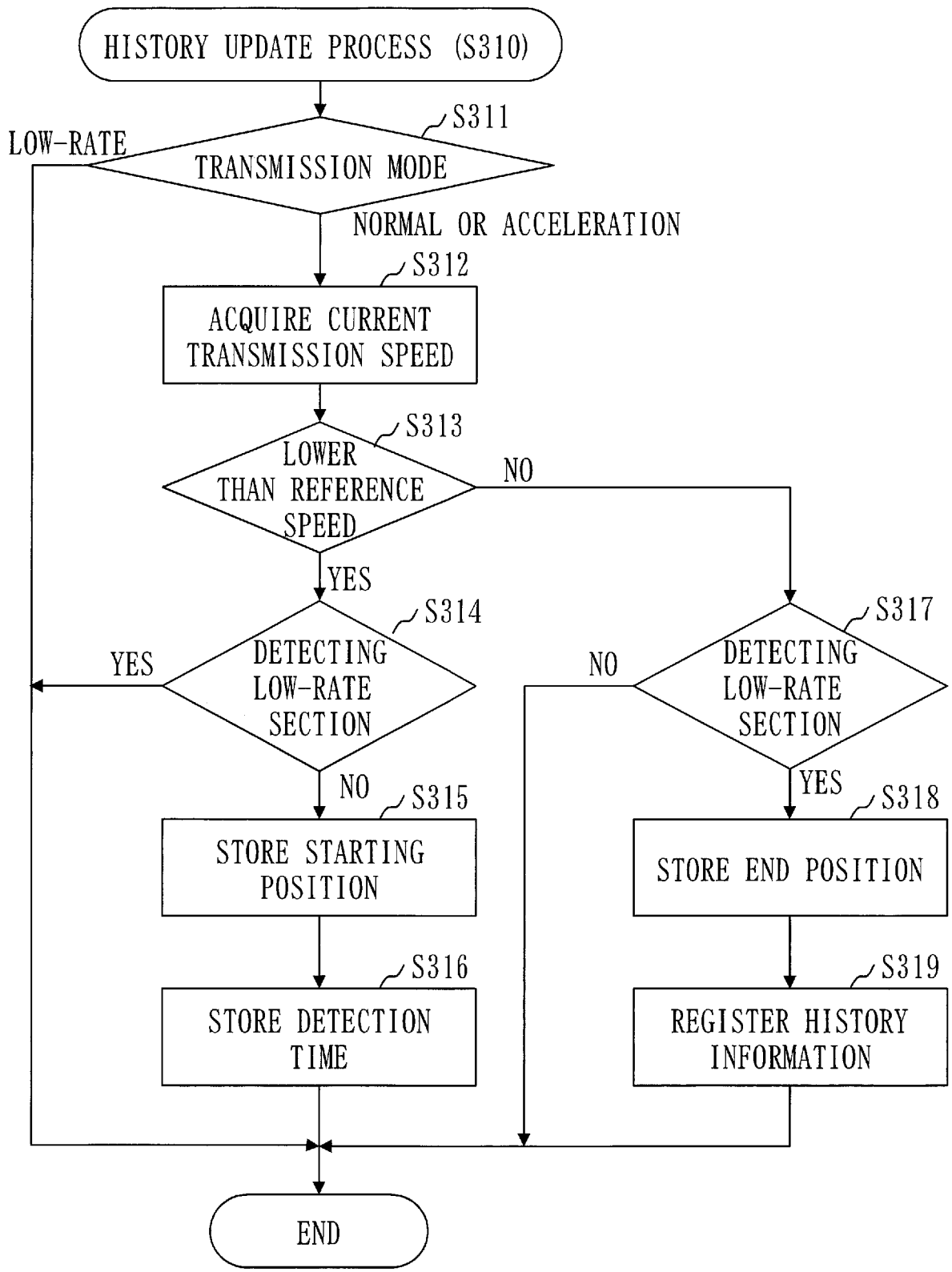
FIG. 20 is a flowchart of a history updating process (S310) according to the third embodiment.

The history updating process (S310) will be described based on FIG. 20.

In the step S311, the history management unit 116 judges a pertinent transmission mode. The pertinent transmission mode is a transmission mode selected in the step S131 (refer to FIG. 17).

If the transmission mode is the "normal" mode or the "acceleration" mode, the processing proceeds to the step S312.

When the transmission mode is the "low-rate" mode, the processing ends.

In the step S312, the history management unit 116 acquires a current transmission speed from the transmission unit 122.

In the step S313, the history management unit 116 compares the current transmission speed with the reference speed.

When the current transmission speed is smaller than the reference speed, the processing proceeds to the step S314.

When the current transmission speed is equal to or more than the reference speed, the procedure proceeds to a step S317.

In the step S314, the history management unit 116 judges whether a low-rate section is being detected.

Specifically, the history management unit 116 judges whether an unregistered starting position is stored in the storage unit 131. When the unregistered starting position is stored in the storage unit 131, the low-rate section is being detected.

When the low-rate section is being detected, the processing ends.

When the low-rate section is not being detected, the processing proceeds to the step S315.

In the step S315, the history management unit 116 stores a current position as a starting position in the storage unit 131.

The current position is a position denoted by position information acquired in the step S101 (refer to FIG. 17).

In a step S316, the history management unit 116 acquires a current time from the clock 107, and stores the current time as a detection time in the storage unit 131.

After the step S316, the processing ends.

In the step S317, the history management unit 116 judges whether a low-rate section is being detected. The judgment method is the same as the method in the step S314.

When the low-rate section is being detected, the processing proceeds to the step S318.

When the low-rate section is not being detected, the processing ends.

In a step S318, the history management unit 116 stores the current position as an end position in the storage unit 131.

In a step S319, the history management unit 116 registers history information in the history table 330.

Specifically, the history management unit 116 acquires the starting position, the end position and the detection time from the storage unit 131. Then, the history management unit 116 registers the starting position, the end position and the detection time in the history table 330. Further, the history management unit 116 registers a communication state in the history table 330. The communication state be set is "poor".

After the step S319, the processing ends.

\*\*\*Effect of Third Embodiment\*\*\*

A history of a section where a transmission speed has been slow when a vehicle has travelled in the past is stored, and a section that is indicated in the history is regarded as a section where the transmission speed is slow. Therefore, even when the transmission speed of the section acquired as navigation information is incorrect, an effect similar to that of the first embodiment will be obtained.

\*\*\*Other Configurations\*\*\*

A low-rate section may be detected based on an accumulated amount of vehicle information inside the buffer 132 at the time of transmission in the past instead of a transmission speed at the time of transmission in the past. The section for which the accumulated amount of the vehicle information is large may be detected as a low-rate section.

The history management unit 116 may delete the history information before a specified time or more. The specified time is a time determined beforehand. This makes it possible to reduce the size of the history table 330, and further to reduce the time for search in the history table 330. Furthermore, since old history information is deleted, it is possible to determine a traveling section corresponding to the low-rate section correctly.

\*\*\*Supplement to Embodiments\*\*\*

Figure 21:
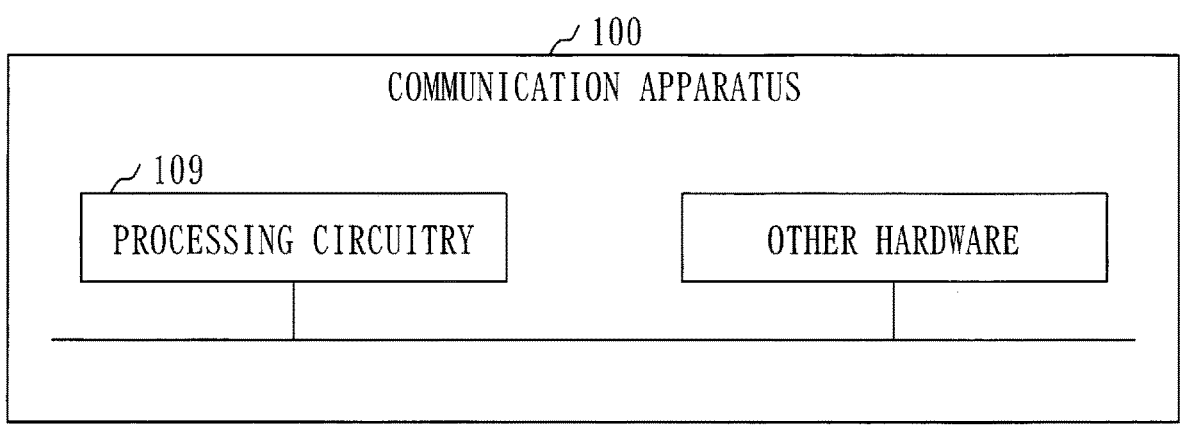
FIG. 21 is a configuration diagram of hardware of the communication apparatus 100 according to the embodiments.

A hardware configuration of the communication apparatus 100 will be described based on FIG. 21.

The communication apparatus 100 includes a processing circuitry 109 and other hardware components. The other hardware components are hardware components such as a wireless communication module 104, a network interface 105, a timer 106 and a clock 107.

The processing circuitry 109 is a hardware component to realize the information management unit 110, the reception unit 121, the transmission unit 122 and the relay unit 123.

The processing circuitry 109 may be a dedicated hardware component, or may be the processor 101 that executes programs stored in the memory 102.

When the processing circuitry 109 is the dedicated hardware component, the processing circuitry 109 is, for example, a single circuit, a composite circuit, a programmed processor, a parallel-programmed processor, an ASIC, an FPGA, or a combination thereof.

ASIC is an abbreviation for Application Specific Integrated Circuit, and FPGA is an abbreviation for Field Programmable Gate Array.

The communication apparatus 100 may include a plurality of processing circuits that replace the processing circuitry 109. The plurality of processing circuits share the roles of the processing circuitry 109.

In the processing circuitry 109, part of the functions may be realized by a dedicated hardware component, and the remaining functions may be realized by software or firmware.

As described above, it is possible to realize the processing circuitry 109 by a hardware component, software, firmware or a combination thereof.

The present embodiments are examples of preferable embodiments, and are not aimed at limiting a technical range of the present invention. The present embodiments may be partially performed, or may be performed by being combined with another embodiment. The procedures described by using flowcharts, etc., may be altered suitably.

REFERENCE SIGNS LIST

100: communication apparatus; 101: processor; 102: memory; 103: auxiliary storage device; 104: wireless communication module; 105: network interface; 106: timer; 107: clock; 109: processing circuitry; 110: information management unit; 111: information acquisition unit; 112: route set unit; 113: state determination unit; 114: mode determination unit; 115: mode selection unit; 116: history management unit; 121: reception unit; 122: transmission unit; 123: relay unit; 131: storage unit; 132: buffer; 200: communication system; 201: collection server, 202: provision server; 209: public wireless network; 211: car navigation device; 212: in-vehicle device; 213: antenna; 214: wireless communication device; 219: in-vehicle LAN; 301: travel route; 302: travel route; 310: control table; 320: mode determination condition; 330: history table

The invention claimed is:

1. A communication apparatus comprising:
processing circuitry
to determine beforehand, based on each transmission speed in one or more traveling sections, a congestion state in each of the one or more traveling sections, and a positional relation between each of the one or more traveling sections and an adjustment section, a transmission mode to specify a priority order of a plurality of types of vehicle information, for each of the one or more traveling sections;
to select a transmission mode at a position where a vehicle is traveling at present, from the transmission mode in each of the one or more traveling sections determined beforehand, and
to transmit the plurality of types of vehicle information in accordance with the priority order specified in the selected transmission mode,
wherein the adjustment section is a section having an adjustment section length, being adjacent to a traveling section where a transmission speed is smaller than a reference speed.

2. The communication apparatus according to claim 1, wherein the processing circuitry determines
a transmission mode of a traveling section where the transmission speed is equal to or more than a reference speed, where a congestion does not exist, and at least a part of which is included in the adjustment section, as an acceleration mode,
and wherein the acceleration mode is a transmission mode wherein a first type of vehicle information is preferentially transmitted, a second type of vehicle information is transmitted in a remaining range of a communication volume in a pertinent traveling section, and a third type of vehicle information is transmitted in a remaining range after the second type of vehicle information has been transmitted.

3. The communication apparatus according to claim 1, wherein the processing circuitry relays transmission speed information to a car navigation device, and
acquires route information including a transmission speed in each of the one or more traveling sections from the car navigation device.

4. The communication apparatus according to claim 1, wherein the processing circuitry acquires route information including a transmission speed in each of the one or more traveling sections, from a car navigation device to receive transmission speed information via a wireless communication device.

5. The communication apparatus according to claim 1, wherein the processing circuitry relays congestion information to a car navigation device;
acquires the congestion state from the car navigation device, and
determines a congestion state in each of the one or more traveling sections based on the congestion information.

6. The communication apparatus according to claim 1, wherein the processing circuitry acquires, from a car navigation device to receive congestion information via a wireless communication device, the congestion information, and
determines a congestion state in each of the one or more traveling sections based on the congestion information.

7. A communication apparatus for which a history table indicating a low-rate section where a transmission speed is smaller than a reference speed is used, the communication apparatus comprising:
processing circuitry
to determine beforehand, based on each transmission speed in one or more traveling sections, a congestion state in each of the one or more traveling sections, and a positional relation between an adjustment section having an adjustment section length, being adjacent to the low-rate section indicated in the history table, and each of the one or more traveling sections, a transmission mode to specify a priority order of a plurality of types of vehicle information, for each of the one or more traveling sections;
to select a transmission mode at a position where a vehicle is traveling at present, from the transmission mode in each of the one or more traveling sections determined beforehand, and
to transmit the plurality of types of vehicle information in accordance with the priority order specified in the transmission mode selected.

8. The communication apparatus according to claim 7, wherein the processing circuitry determines
from among the one or more traveling sections other than the traveling section corresponding to the low-rate section, a transmission mode in a traveling section where a transmission speed is equal to or more than a reference speed, where a congestion does not exist, and at least a part of which is included in an adjustment section, as an acceleration mode,
and wherein the acceleration mode is a transmission mode wherein a first type of vehicle information is preferentially transmitted, a second type of vehicle information is transmitted in a remaining range of a communication volume in a pertinent traveling section, and a third type of vehicle information is transmitted in a remaining range after the second type of vehicle information has been transmitted.

9. A communication apparatus comprising:
processing circuitry
to determine beforehand, based on each transmission speed in one or more traveling sections, a congestion state in each of the one or more traveling sections, and a positional relation between each of the one or more traveling sections and an adjustment section, a transmission mode to specify a priority order of a plurality of types of vehicle information, for each of the one or more traveling sections;

to select a transmission mode at a position where a vehicle is traveling at present, from the transmission mode in each of the one or more traveling sections determined beforehand, and to transmit the plurality of types of vehicle information in accordance with the priority order specified in the transmission mode selected, wherein the processing circuitry determines the transmission mode in each of the one or more traveling sections as any of a first transmission mode, a second transmission mode and a third transmission mode, and wherein the first transmission mode is a transmission mode wherein a first type of vehicle information is preferentially transmitted, a third type of vehicle information is transmitted in a remaining range of a communication volume in a pertinent traveling section, and a second type of vehicle information is not transmitted, the second transmission mode is a transmission mode wherein the first type of vehicle information is preferentially transmitted, the second type of vehicle information is transmitted in a remaining range of a standard volume smaller than the communication volume in the pertinent traveling section, and the third type of vehicle information is transmitted in a remaining range of the communication volume in the pertinent traveling section, the third transmission mode is a transmission mode wherein the first type of vehicle information is preferentially transmitted, the second type of vehicle information is transmitted in a remaining range of the communication volume in the pertinent traveling section, and the third type of vehicle information is transmitted in a remaining range after the second type of vehicle information has been transmitted, and the adjustment section is a section having an adjustment section length, being adjacent to a traveling section in the first transmission mode.

10. The communication apparatus according to claim 9, wherein the processing circuitry determines:

a transmission mode in a traveling section where the transmission speed is smaller than a reference speed as the first transmission mode;

a transmission mode in a traveling section where the transmission speed is equal to or more than the reference speed, and where a congestion exists, as the second transmission mode;

a transmission mode of a traveling section where the transmission speed is equal to or more than the reference speed, where a congestion does not exist, and at least a part of which is included in an adjustment section, as the third transmission mode, and a transmission mode of a traveling section where the transmission speed is equal to or more than the reference speed, where a congestion does not exist, and even at least a part of which is not included in the adjustment section, as the second transmission mode.

11. The communication apparatus according to claim 9, wherein the processing circuitry transmits the second type of vehicle information that has occurred before the vehicle enters a traveling section in the first transmission mode in a first adjustment section immediately before the traveling section in the first transmission mode, and transmits the second type of vehicle information that has occurred while the vehicle travels through the traveling section in the first transmission mode in a second adjustment section immediately behind the traveling section in the first transmission mode without transmitting the same in the traveling section in the first transmission mode.

12. A communication apparatus for which a history table indicating a low-rate section where a transmission speed is smaller than a reference speed is used, the communication apparatus comprising:

processing circuitry to determine beforehand, based on each transmission speed in one or more traveling sections, a congestion state in each of the one or more traveling sections, and a positional relation between an adjustment section having an adjustment section length, being adjacent to the low-rate section indicated in the history table, and each of the one or more traveling sections, a transmission mode to specify a priority order of a plurality of types of vehicle information, for each of the one or more traveling sections;

to select a transmission mode at a position where a vehicle is traveling at present, from the transmission mode in each of the one or more traveling sections determined beforehand, and to transmit the plurality of types of vehicle information in accordance with the priority order specified in the transmission mode selected, wherein the processing circuitry determines the transmission mode in each of the one or more traveling sections as any of a first transmission mode, a second transmission mode and a third transmission mode, and wherein the first transmission mode is a transmission mode wherein a first type of vehicle information is preferentially transmitted, a third type of vehicle information is transmitted in a remaining range of a communication volume in a pertinent traveling section, and a second type of vehicle information is not transmitted, the second transmission mode is a transmission mode wherein the first type of vehicle information is preferentially transmitted, the second type of vehicle information is transmitted in a remaining range of a standard volume smaller than the communication volume in the pertinent traveling section, and the third type of vehicle information is transmitted in a remaining range of the communication volume in the pertinent traveling section, and the third transmission mode is a transmission mode wherein the first type of vehicle information is preferentially transmitted, the second type of vehicle information is transmitted in a remaining range of the communication volume in the pertinent traveling section, and the third type of vehicle information is transmitted in a remaining range after the second type of vehicle information has been transmitted.

13. The communication apparatus according to claim 12, wherein the processing circuitry judges whether each of the one or more traveling sections is a section corresponding to the low-rate section based on the history table, determines a transmission mode in a traveling section corresponding to the low-rate section as the first transmission mode regardless of a transmission speed and a congestion state, and judges a transmission mode in a traveling section other than the traveling section corresponding to the low-rate section based on the transmission speed and the congestion state.

14. The communication apparatus according to claim 13, wherein the processing circuitry determines:

from among the one or more traveling sections other than the traveling section corresponding to the low-rate section, a transmission mode in a traveling section where a transmission speed is smaller than a reference speed, as the first transmission mode;

from among the one or more traveling sections other than the traveling section corresponding to the low-rate section, a transmission mode in a traveling section where a transmission speed is equal to or more than the reference speed, and where a congestion exists, as the second transmission mode;

from among the one or more traveling sections other than the traveling section corresponding to the low-rate section, a transmission mode in a traveling section where a transmission speed is equal to or more than the reference speed, where a congestion does not exist, and at least a part of which is included in the adjustment section, as the third transmission mode, and from among the one or more traveling sections other than the traveling section corresponding to the low-rate section, a transmission mode in a traveling section where a transmission speed is equal to or more than the reference speed, where a congestion does not exist, and even at least a part of which is not included in the adjustment section, as the second transmission mode.

15. A non-transitory computer readable medium storing a communication program to make a computer execute:

a mode determination process to determine beforehand, based on each transmission speed of one or more traveling sections, a congestion state in each of the one or more traveling sections, and a positional relation between each of the one or more traveling sections and an adjustment section, a transmission mode to specify a priority order of a plurality of types of vehicle information for each of the one or more traveling sections;

a mode selection process to select a transmission mode at a position where a vehicle is traveling at present, from the transmission mode in each of the one or more traveling sections determined beforehand, and a transmission process to transmit the plurality of types of vehicle information in accordance with the priority order specified in the transmission mode selected, wherein the adjustment section is a section having an adjustment section length, being adjacent to a traveling section where a transmission speed is smaller than a reference speed.

16. A non-transitory computer readable medium storing a communication program for which a history table indicating a low-rate section where a transmission speed is smaller than a reference speed is used, the communication program to make a computer execute:

a mode determination process to determine beforehand, based on each transmission speed of one or more traveling sections, a congestion state in each of the one or more traveling sections, and a positional relation between an adjustment section having an adjustment section length, being adjacent to the low-rate section indicated in the history table, and each of the one or more traveling sections, a transmission mode to specify a priority order of a plurality of types of vehicle information for each of the one or more traveling sections;

a mode selection process to select a transmission mode at a position where a vehicle is traveling at present, from the transmission mode in each of the one or more traveling sections determined beforehand, and a transmission process to transmit the plurality of types of vehicle information in accordance with the priority order specified in the transmission mode selected.

* * * * *